United States Patent
Wijekoon et al.

(10) Patent No.: US 9,331,481 B2
(45) Date of Patent: May 3, 2016

(54) SYSTEMS AND METHODS FOR POWER TRANSMISSION WITH CABLE SEGMENT FAILOVER SUPPORT

(75) Inventors: Piniwan Thiwanka Bandara Wijekoon, Munich (DE); Christof Martin Sihler, Hallbergmoos (DE); Simon Herbert Schramm, Munich (DE)

(73) Assignee: General Electric Company, Niskayuna, NY (US)

( * ) Notice: Subject to any disclaimer, the term of this patent is extended or adjusted under 35 U.S.C. 154(b) by 916 days.

(21) Appl. No.: 13/600,556

(22) Filed: Aug. 31, 2012

(65) Prior Publication Data

US 2014/0062196 A1   Mar. 6, 2014

(51) Int. Cl.
- *H02J 3/00* (2006.01)
- *H02J 1/00* (2006.01)
- *H02J 3/14* (2006.01)
- *H02H 7/26* (2006.01)
- *H02J 3/36* (2006.01)

(52) U.S. Cl.
CPC .............. *H02J 3/006* (2013.01); *H02H 7/267* (2013.01); *H02H 7/268* (2013.01); *H02J 3/36* (2013.01); *Y02E 60/60* (2013.01); *Y04S 10/525* (2013.01); *Y10T 307/469* (2015.04)

(58) Field of Classification Search
CPC ......... H02H 7/267; H02H 7/268; H02J 3/006; H02J 3/36; Y10T 307/469; Y02E 60/60
USPC ........................................................ 307/39
See application file for complete search history.

(56) References Cited

U.S. PATENT DOCUMENTS

| | | | |
|---|---|---|---|
| 4,638,416 A | 1/1987 | Neupauer et al. |
| 4,648,018 A | 3/1987 | Neupauer |
| 7,851,943 B2 | 12/2010 | Datta et al. |
| 2008/0103630 A1 | 5/2008 | Eckroad |
| 2008/0137382 A1 | 6/2008 | Datta et al. |
| 2008/0252142 A1 | 10/2008 | Davies et al. |
| 2008/0284249 A1 | 11/2008 | Datta et al. |
| 2009/0219737 A1 | 9/2009 | Bjorklund et al. |
| 2009/0316446 A1 | 12/2009 | Astrom et al. |

(Continued)

OTHER PUBLICATIONS

Zhan et al., "DC Transmission and Distribution System for a Large Offshore Wind Farm", AC and DC Power Transmission, 2010. ACDC. 9th IET International Conference, Oct. 19-21, 2010, pp. 1-5.

(Continued)

*Primary Examiner* — Rexford Barnie
*Assistant Examiner* — Toan Vu
(74) *Attorney, Agent, or Firm* — Nitin N. Joshi

(57) ABSTRACT

A power transmission system is provided. The power transmission system includes at least one power substation for receiving power from a power source, and a Direct Current (DC) cable for transferring the power from the power source to the power substation. The DC cable includes a plurality of segments individually or in combination forming a path to route the power to the power substation. The system further includes at least one segment switch unit electrically coupled to each segment. At least one of the segment switch units includes a shorting switch element for providing a short circuit path to prevent the power from the power source to be routed to a respective segment in response to a shorting command, and a disconnect switch element for disconnecting the respective segment in response to a disconnect command.

15 Claims, 15 Drawing Sheets

(56) References Cited

U.S. PATENT DOCUMENTS

| | | |
|---|---|---|
| 2010/0046255 A1 | 2/2010 | Paajarvi |
| 2010/0091527 A1 | 4/2010 | Asplund |
| 2010/0133901 A1 | 6/2010 | Zhang et al. |
| 2011/0177954 A1 | 7/2011 | Gamble et al. |
| 2012/0025535 A1 | 2/2012 | Sihler et al. |
| 2012/0092904 A1* | 4/2012 | Nuqui ............... H02J 3/36 363/35 |
| 2013/0197704 A1* | 8/2013 | Pan .................... H02J 3/36 700/287 |

OTHER PUBLICATIONS

Sihler et al., "HVDC Power Transmission With Cable Fault Ride-Throughout Capability", Pending U.S. Appl. No. 13/093,058, filed Apr. 25, 2011, 27 Pages.

Gupta et al., "Remote Load Bypass System", Pending U.S. Appl. No. 13/478,310, filed May 23, 2012, 25 pages.

PCT Search Report and Written Opinion issued Jul. 2, 2014 in connection with corresponding PCT Patent Application No. PCT/US2013/054850.

* cited by examiner

SYSTEMS AND METHODS FOR POWER TRANSMISSION WITH CABLE SEGMENT FAILOVER SUPPORT

BACKGROUND

The invention relates generally to systems and methods for electrical power transmission and, more particularly, to systems and methods for electrical power transmission using a direct current (DC) cable.

Alternating current (AC) transmission systems may be inefficient for transmitting high voltage power over long distances as capacitance in an AC cable reduces the load carrying capability of the AC cable. In contrast, DC transmission may provide a more efficient way to transmit high voltage power over long distances. Medium voltage (MV) and high voltage (HV) DC are two commonly used long distance transmission DC systems across various applications such as, for example, subsea processing for oil and gas industry and offshore wind power production.

There is a growing need to deliver power from onshore or offshore platforms to electrical loads at seabeds or remote offshore locations. However, conventional HVDC systems may not be well suited for sub-sea installations due to the size and high number of components involved.

Further, long distance transmission such as that used for sub-sea power transmission may be achieved via sub-sea cables that carry the power from a power source such as a DC source or an AC source to one or more offshore power stations and substations. However, with increasing cable length, the probability of a cable fault may increase. Repairing sub-sea cables may require a long time, for example, several weeks. In the meantime, the fault in the cable may affect the power supply to the power station/substation to which the faulty cable is connected.

Thus, there is a need to provide a power transmission system that is less expensive, reliable, and fully operational even in the case of a cable fault. Further, there is a need to provide a power transmission system in which the faulty cable may be repaired or replaced while the power transmission system is in operation.

BRIEF DESCRIPTION

In accordance with one embodiment, a power transmission system is provided. The power transmission system includes at least one power substation for receiving power from a power source, and a Direct Current (DC) cable for transferring the power from the power source to the power substation. The DC cable includes a plurality of segments individually or in combination forming a path to route the power to the power substation. The system further includes at least one segment switch unit electrically coupled to each of the segments. At least one of the segment switch units includes at least one shorting switch element for providing a short circuit path to prevent the power from the power source to be routed to a respective segment in response to a shorting command, and at least one disconnect switch element for disconnecting the respective segment in response to a disconnect command.

In another embodiment a subsea DC power transmission system is provided. The system includes an onshore system and an offshore system. The onshore system includes a power source. The offshore system includes power substations for receiving power from the power source. At least one or more of the power substations include a sub modular stacked power conversion system comprising a plurality of sub power converter modules. The offshore system further includes a main power station electrically coupled between the power source and the power substations. The main power station includes a main modular stacked power conversion system comprising a plurality of main power converter modules. The offshore system further includes a main switch unit and a DC cable for transferring the power from the power source to the power substations. The DC cable includes a plurality of segments between the main switch unit and the power substations, the segments individually or in combination forming a path to route the power to the power substations. The offshore system further includes at least one segment switch unit electrically coupled to each of the segments. At least one of the segment switch units includes a shorting switch element for providing a short circuit path to prevent the power from the power source to be routed to a respective segment in response to a shorting command. The at least one of the segment switch units further includes at least one disconnect switch element for disconnecting the respective segment in response to a disconnect command.

In yet another embodiment, a method for transmitting power in a power transmission system is provided. The power transmission system includes power substations for receiving power from a power source, and a DC cable comprising a plurality of segments individually or in combination forming a path to route the power to the power substations. The method includes, in the event of a fault on or a maintenance event for a respective segment, ensuring that the power transmission system remains operational by: triggering at least one shorting switch element for providing a short circuit path to prevent the power from the power source to be routed to the respective segment, triggering at least one disconnect switch element for disconnecting the respective segment, and routing the power to the power substations via at least one operational segment of the plurality of segments.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
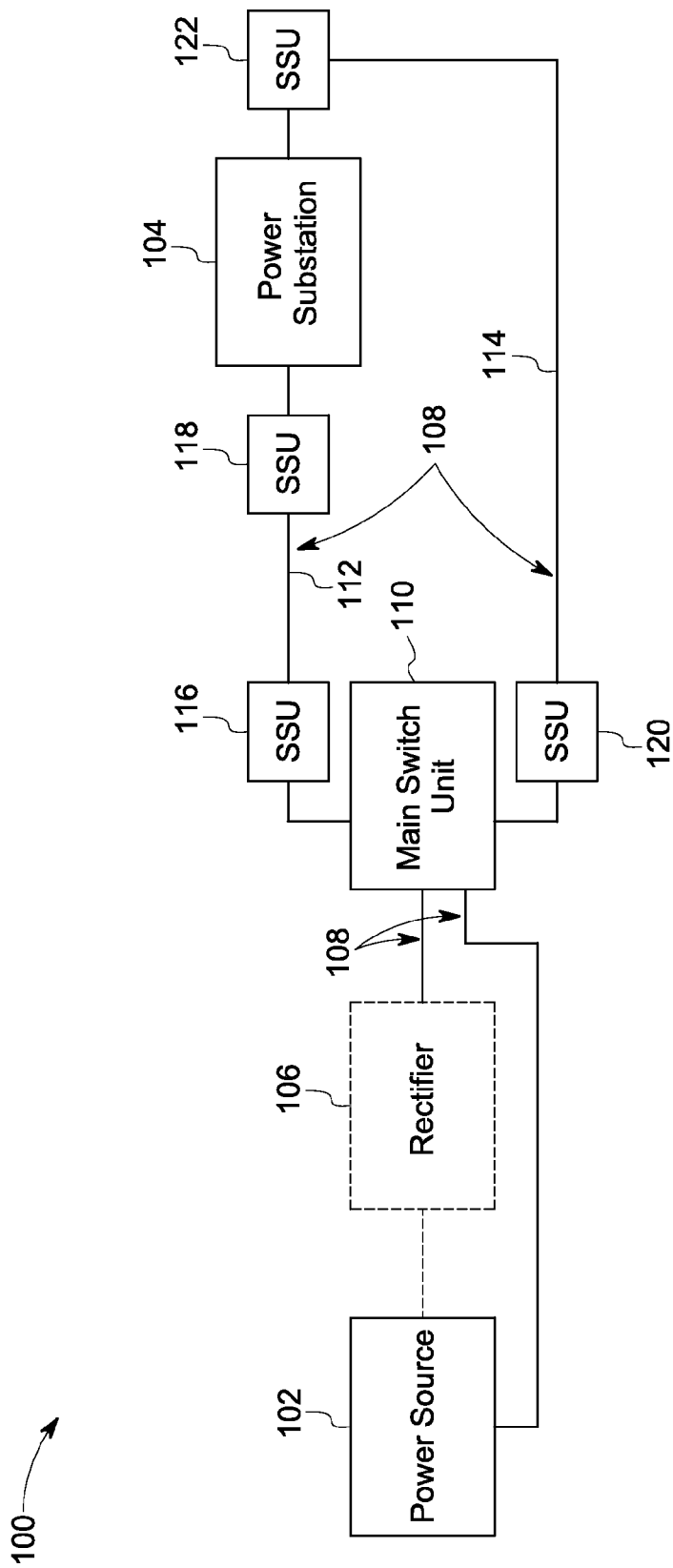
FIG. 1 is a block diagram of a power transmission system for transmitting electrical power from a power source to a first power substation, in accordance with one embodiment.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "circuit," "circuitry," "controller," and "processor" may include either a single component or a plurality of components, which are either active and/or passive and are connected or otherwise coupled together to provide the described function. Additionally, for purposes of explanation, specific numbers, materials, and configurations are set forth in order to provide a thorough understanding of various embodiments of the invention. The skilled artisan will recognize the interchangeability of various features from different embodiments. Similarly, the various method steps and features described, as well as other known equivalents for each such methods and features, can be mixed and matched by one of ordinary skill in this art to construct additional assemblies and techniques in accordance with principles of this disclosure.

Embodiments of the present invention may include a power transmission system, such as, a direct current (DC) transmission system configured to transmit and distribute power. In some embodiments, the DC transmission system may provide a fully operating network with uninterrupted power supply to a load connected to one or more power stations and/or power substations during the event of a fault in one or more segments of a DC cable. The term "fully operating network" as used herein refers to operating the DC transmission system such that all power stations/substations are operated at full capacity in the event of the fault. In other words, the DC transmission system may provide a failover support in the event of the fault in the DC cable segment.

In one embodiment, the fault in a cable segment may be determined remotely. In another embodiment, the event of the fault may be predicted and mitigated or prevented in a scheduled maintenance event such as, for example, by repairing or replacing the cable segment when general wear and tear is observed or expected. Some embodiments are described below with respect to the event of the fault; however, those embodiments may be equally applicable for the scheduled maintenance event as well. Further, some embodiments provide the flexibility of repairing or replacing a faulty segment of the DC cable while the DC transmission system is operational. A power source provides power to a power conversion system that may convert the received power to DC power. The power is transmitted to the power stations/substations, via the DC cable segments. Various embodiments of a power transmission system are described below.

FIG. 1 is a block diagram of a power transmission system 100 for transmitting electrical power from a power source 102 to a power substation 104, in accordance with one embodiment. The power transmission system 100 may be a medium voltage (MV) DC or a high voltage (HV) DC transmission system. This type of transmission system is used across various applications, such as, but not limited to, subsea processing for oil and gas industry and offshore wind power production. In some embodiments, the power source 102 may comprise an alternating current (AC) power source, and, in such embodiments, the power transmission system 100 may further include a power conversion system including a rectifier 106 for converting AC power to DC power. In some other embodiments, the power source 102 may comprise a DC power source, and, in such embodiments, the power transmission system 100 may optionally include a power conversion system including a DC-DC power converter (not shown in FIG. 1). The power transmission system 100 further includes a DC cable 108 that comprises a plurality of segments and is configured to carry power from the power source 102 to the power substation 104.

The power transmission system 100 of FIG. 1 further includes a main switch unit 110 electrically coupled between the power source 102 and the power substation 104. The term "main switch unit" as used herein refers to a switching device that determines a path for routing the power to various components in the power transmission system 100, such as the power substation 104. As shown in FIG. 1, in some embodiments, the DC cable 108 includes a first segment 112 and a second segment 114 such that the first segment 112 may electrically couple the main switch unit 110 to one end of the power substation 104, and the second segment 114 may electrically couple the main switch unit 110 to another end of the same power substation 104. The network formed by this arrangement is similar to a ring network. During normal operation, the main switch unit 110 may route the power to the power substation 104 via any one of or both the first and second segments 112 and 114. The term "normal operation" as used herein refers to an operation of a power transmission system (such as 100) wherein all DC cable segments are operational. The first and second segments 112 and 114 may individually or in combination form the path to route the power to the power substation 104. In this embodiment, the main switch unit 110 may route the power to the power substation 104 via the second segment 114 in the event of the fault in the first segment 112. Similarly, the main switch unit 110 may route the power to the power substation 104 via the first segment 112 in the event of the fault in the second segment 114.

In the embodiment of FIG. 1, the power transmission system 100 includes a pair of first segment switch units 116 and 118 electrically coupled to the first segment 112, and a pair of second segment switch units 120 and 122 electrically coupled to the second segment 114. In an alternative embodiment (not shown), the power transmission system 100 may include a single segment switch unit electrically coupled to the first segment 112 and a single segment switch unit electrically coupled to the second segment 114. The term "segment switch unit" as used herein refers to a switch device that is configured to electrically couple/decouple its respective segment to/from a power transmission system (such as 100).

Figure 2:
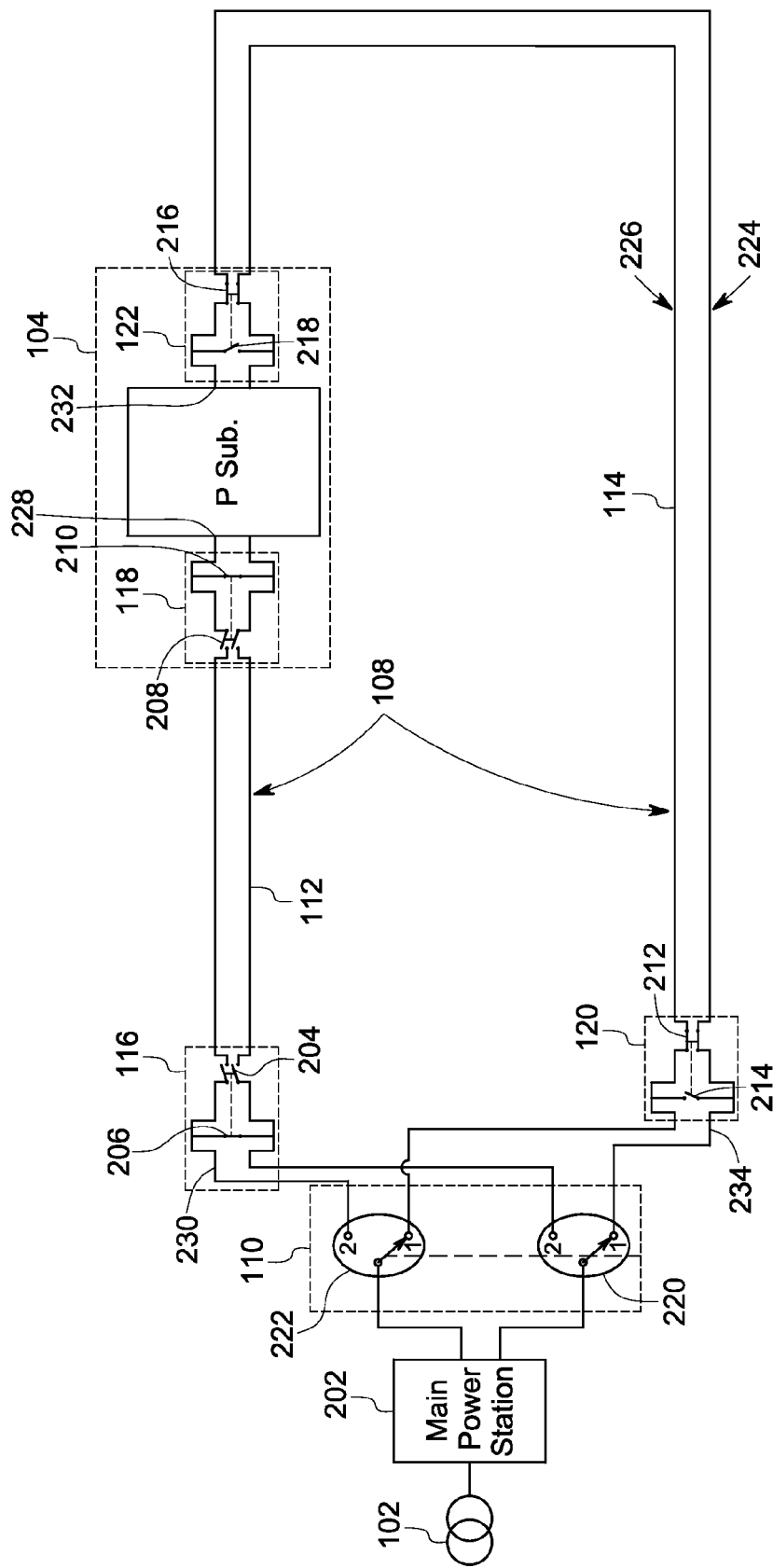
FIG. 2 is a schematic representation of the power transmission system of FIG. 1 in the event of the fault in a first segment of a DC cable.

In one embodiment, the units of the pair of first segment switch units 116 and 118 or the pair of second segment switch units 120 and 122 are electrically coupled at opposite ends of the first segment 112 or the second segment 114, respectively. FIG. 1 illustrates an embodiment wherein the segment switch units are situated outside of the power substation 104 and the main switch unit 110. FIG. 2 illustrates an embodiment wherein the segment switch units 118 and 122 are integrated into the power substation 104. In another embodiment (not shown), the segment switch units 116 and 120 may be integrated into the main switch unit 110. In embodiments wherein the segment switches are not integrated into a power substation or main switch unit, the segment switch units may be situated near the opposite ends of the respective segment and integrated within the respective segment. In such embodiments, the respective segment may be considered as being divided into two or more sub-segments. In another embodiment wherein the two options are combined (not shown), one pair of segment switch units may be electrically coupled at or near the opposing ends of a respective segment and one or more other segment switch units may be positioned therebetween. In this example, the segment may be divided into multiple sub-segments such that the adjacent ones of the segment switch units together define opposing ends of respective sub-segments. This embodiment may be useful when the segment is long.

A cable segment experiencing a known fault or a scheduled maintenance event due to a predicted fault will hereinafter interchangeably be referred to as a faulty segment. Also, a cable segment that is operational (or not faulty) will hereinafter interchangeably be referred to as an operational segment. In the event of the fault in the first segment 112, the first segment switch units 116 and 118 is configured to disconnect the faulty segment 112, thereby electrically isolating the faulty segment 112 from the rest of the power transmission system 100. Additionally, the first segment switch units 116 and 118 may be further configured to provide a short circuit path to prevent the power from the power source 102 to be routed to the respective segment 112. In this example, the second segment switch units 120 and 122 are configured to electrically connect the operational segment, that is, the second segment 114 to the rest of the power transmission system 100. If the second segment 114 is not already coupled to the power substation 104, the connection of the operational second segment 114 may be performed prior to, simultaneous with, or subsequent to the disconnection of the faulty segment 112 and creation of the short circuit path. If second segment 114 is already connected to the rest of the power transmission system 100 during the normal operation, the configurations of the second segment switch units 120 and 122 may remain unchanged upon determination of the fault event in the first segment 112.

Similarly, in the event of the fault in the second segment 114, the second segment switch units 120 and 122 may be configured to be disconnected and provide a short circuit path to prevent the power to be routed to the respective segment 114, and the first segment switch units 116 and 118 may be configured to electrically connect the operational segment 112 to the rest of the power transmission system 100.

In some embodiments, the main switch unit 110 may be configured to route the power from the power source 102 to the power substation 104 via the operational segment 112 or 114, depending upon the faulty segment. Routing of power by the main switch unit 110 may be performed simultaneous with or subsequent to the disconnection of the faulty segment, creation of the short circuit path, and connection of the operational segment.

As noted earlier, in some embodiments, the power transmission system 100 may be fully operational even in the event of the fault. Once the faulty segment is either replaced with a new segment or repaired for re-use, the pair of segment switch units associated with the faulty segment may be configured to electrically connect the replaced/repaired segment to the power transmission system 100 such that the power may be routed through the repaired/replaced segment. Thereafter, the power transmission system 100 operates normally as described above.

Figure 3:
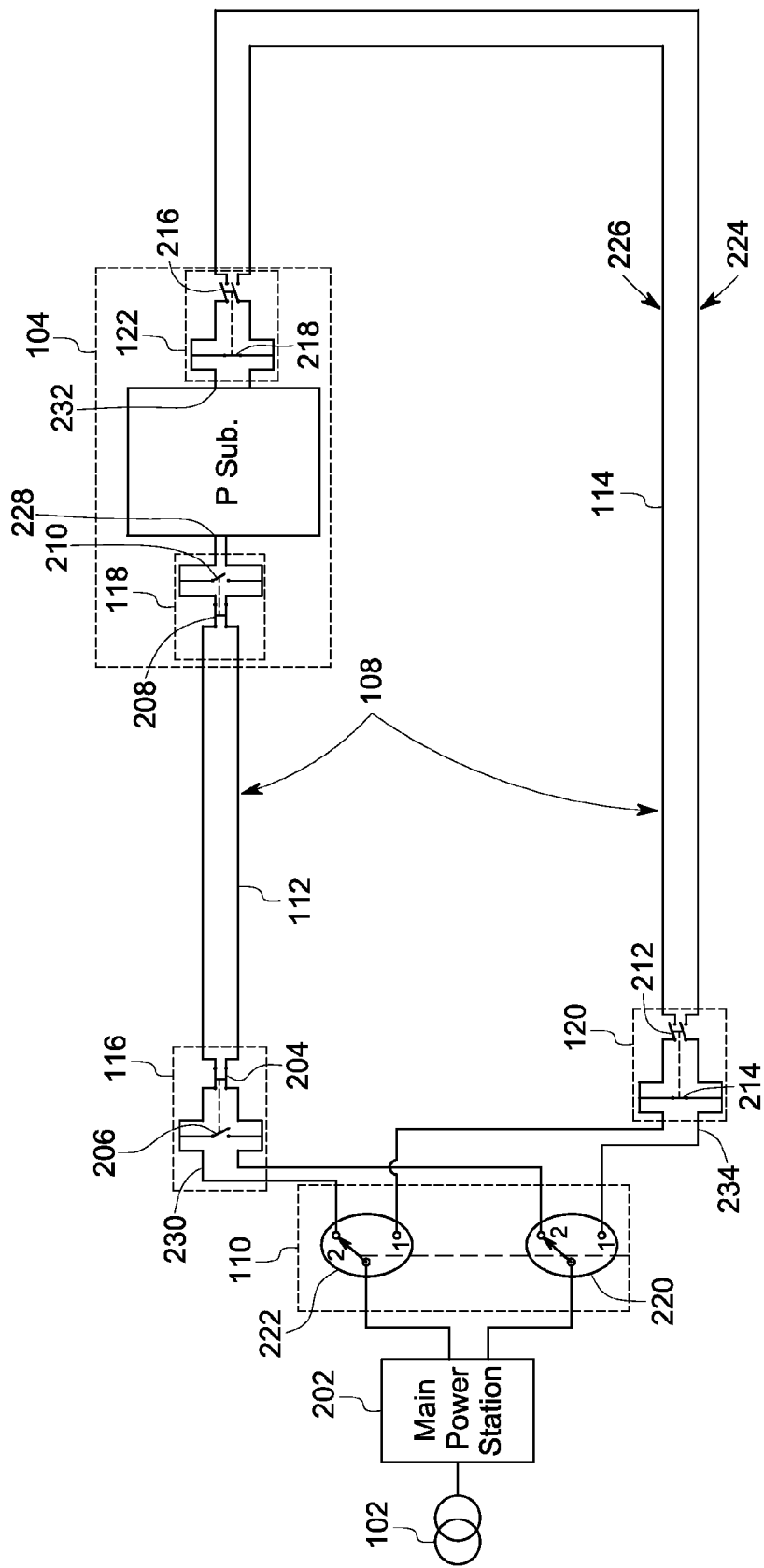
FIG. 3 is a schematic representation of the power transmission system of FIG. 1 in the event of the fault in a second segment of the DC cable.
Figure 11:
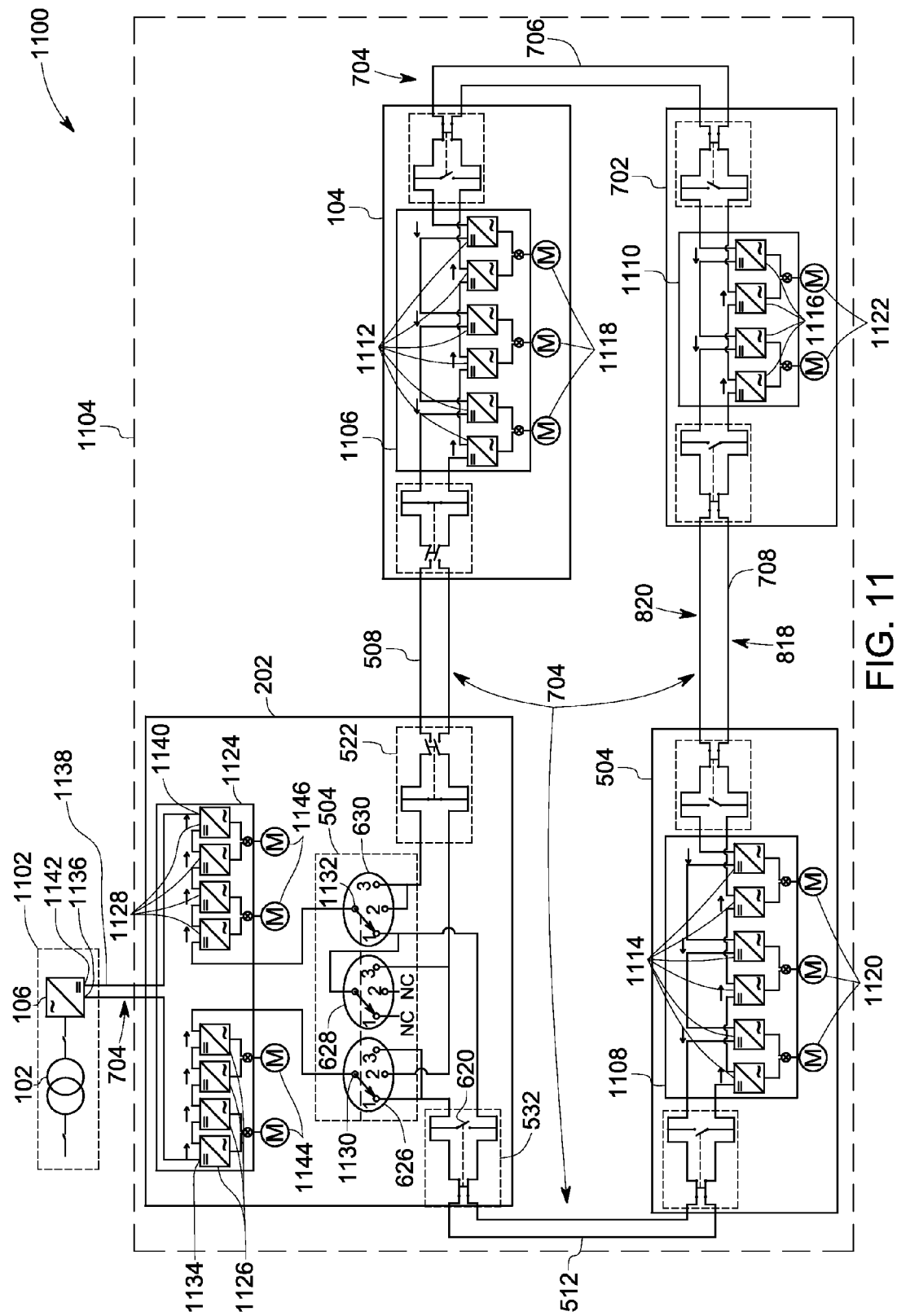
FIG. 11 is a schematic representation of a subsea DC power transmission system, in accordance with one embodiment.

FIG. 2 is a schematic representation of the power transmission system 100 in the event of the fault in the first segment 112; and FIG. 3 is a schematic representation of the power transmission system 100 in the event of the fault in the second segment 114. In the embodiment of FIGS. 2 and 3, the power transmission system 100 further includes a main power station 202 electrically coupled between the power source 102 and the power substation 104. In some other embodiments, as shown in FIG. 11, the main switch unit 110 and the segment switch units 116 and 120 may be located within the main power system 202.

In some embodiments, some or all of the segment switch units may include a combination of a disconnect switch element and a shorting switch element. As shown in FIGS. 2 and 3, the first segment switch unit 116 includes a disconnect switch element 204 and a shorting switch element 206. Similarly, the first segment switch unit 118 includes a disconnect switch element 208 and a shorting switch element 210; the second segment switch unit 120 includes a disconnect switch element 212 and a shorting switch element 214; and the second segment switch unit 122 includes a disconnect switch element 216 and a shorting switch element 218. In some embodiments, disconnect and shorting switch elements of the same segment switch unit may be configured to be triggered simultaneously (as shown by dotted lines connecting disconnect and shorting switch elements). In other embodiments, to avoid or reduce an arc flash, it may be useful to trigger the shorting switch element to provide a short circuit path prior to causing the disconnect switch element to disconnect the respective segment. The configurations of these disconnect and shorting switch elements may be inversely proportional such that if one of these switches is closed, the other may be opened. In the embodiment illustrated in FIG. 2, the disconnect switch elements 204 and 208 may both be configured to disconnect the respective faulty segment 112. In such embodiments, as shown in FIG. 2, in the event of a fault in the first segment 112, the disconnect switch elements 204 and 208 are configured to be in open positions such that the first segment 112 is electrically isolated from the power transmission system 100, and the disconnect switch elements 212 and 216 are configured to be in closed positions to electrically connect the operational segment 114 to the rest of the power transmission system 100, specifically to the power substation 104.

In some embodiments, as illustrated in FIG. 2, the main switch unit 110 includes two pole two position switches, that is, main switches 220 and 222 that are configured to be switched to position "1" simultaneously in the event of the fault in the first segment 112. Switching to position "1" results in the power to be routed to the power substation 104 through the second segment 114 while bypassing the faulty segment 112.

In some embodiments as shown in FIGS. 2 and 3, the DC cable 108 includes a first conducting path 224 and a second conducting path 226. The DC cable 108 may comprise a bipolar DC cable or a combination of two monopole DC conducting paths such that the first and second conducting paths 224 and 226 may be electrically connected to each other at various locations in the DC cable 108. The monopole DC conducting paths may be combined together and integrated inside a single enclosure, in accordance with one embodiment. In some embodiments as illustrated in FIG. 2, the power is routed to the power substation 104 through the first conducting path 224 of the operational segment 114 such that the power substation 104 is fully operational.

In some embodiments, it is desirable that the power received at the power substation 104 be prevented from being further routed to the faulty segment 112. As shown in FIG. 2, the shorting switch element 210 may be configured to provide a short circuit path for the power received at its terminal 228, in the event of the fault on the first segment 112. In order to provide the short circuit path, the shorting switch element 210 may be configured to be in the closed position in such embodiments. Therefore, in some embodiments, the power received at the terminal 228 via the first conducting path 224 may be routed to the main power station 202 via the second conducting path 226 of the operational segment 114. Similarly, as shown in FIG. 2, the shorting switch element 206 is configured to provide a short circuit path for any power received at its terminal 230 from the main power station 202. Though it is advantageous to have disconnect and shorting features at or near both ends of a cable segment, in some embodiments, as discussed above, a single segment switch unit may be implemented in each segment. In single switch unit embodiments including the main switch unit 110, the segment switch unit may be provided near or at the power substation 104. In some embodiments, the segment switch unit may be a semiconductor switch unit, a mechanical switch unit, or a combination thereof.

In some embodiments, once the faulty segment 112 is repaired or replaced with a new segment, the repaired/replaced segment may be positioned between the first segment switch units 116 and 118 (or, if the faulty segment includes those switch units, between the main switch unit 110 and the power substation 104). The configurations of the disconnect switch elements 204 and 208 may be reversed, that is, switched to the closed positions such that the repaired/replaced segment is electrically connected to the power transmission system 100. The shorting switch elements 206 and 210 may then be configured to be in the open positions to remove the short circuit paths. In certain embodiments wherein the power is intended to be supplied to the power substation primarily via the repaired/replaced segment, the shorting switch elements 120 and 122 may be configured to be in closed positions and the disconnect switch elements 212 and 216 may be configured to be in open positions once the repaired/replaced segment is operational, that is, once the disconnect switch elements 204 and 208 are closed and the shorting switch elements 206 and 210 are opened. In such embodiments, the main switch unit 110 may be configured to be switched to position "2" such that the power is routed through the repaired/replaced segment, while bypassing the second segment 114.

FIG. 3 illustrates an example with a faulty second segment 114. In the embodiment shown in FIG. 3, the configurations of the disconnect switch elements 204, 208, 212, and 216 and the shorting switch elements 206, 210, 214, and 218 are opposite to those described above in conjunction with FIG. 2, and the configurations of the main switches 220 and 222 are reversed such that they are switched to position "2," rather than position "1" as in FIG. 2, to result in the power being routed to the power substation 104 through the first segment 112.

It will be apparent to one of ordinary skill in the art that although FIGS. 2 and 3 illustrate a two pole two position-based main switch unit 110, other types of the main switch unit may be used. One non-limiting example is a two pole three position type of switch. In embodiments where two pole three position main switches are used, one position in each of the two main switches may not be used, for example, kept "Not Connected (NC)."

Further, the main switch unit 110 may be situated at the main power station 202, the power source 102, or at any other platform in the power transmission system 100 between the power source 102 and the power substation 104. In one embodiment, the main switch unit 110 may comprise an on-load switch unit. The term "on-load switch unit" as used herein refers to an electrical switch that can be operated while current is still passing through it, that is, it is on load. In embodiments where in the on-load switch unit is used, the power transmission system 100 may operate without any interruption of the power supply at the time of isolation of the faulty segment and re-connection of the repaired/replaced segment. Alternatively, in some embodiments, the main switch unit 110 may comprise an off-load switch unit. The term "off-load switch unit" as used herein refers to an electrical switch that can be operated only when there is no current passing through it, that is, it is off load. In embodiments where the off-load switch unit is used, during transition, that is, when the operation of a segment switch unit is to be switched from connected/not shorted to disconnected/shorted (or vice versa), loads connected to a power substation may be momentarily shut down; thereafter the segment switch unit may be transitioned as desired and power to the loads may be resumed. In such embodiments, there may be a slight interruption, for example, for around 100 milliseconds due to the momentary shut down of the loads. The off-load switches may be useful to avoid or eliminate an arc flash during the transition. Any known system or technique for arc elimination may be used without deviating from the scope of the invention.

Figure 4:
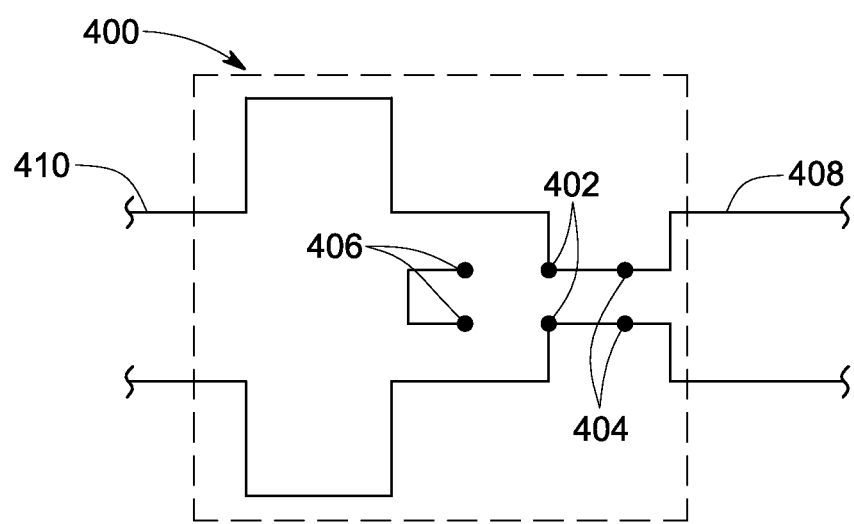
FIG. 4 illustrates a three pole type segment switch unit, in accordance with one embodiment.

It will be apparent to one of ordinary skill in the art that although FIGS. 2 and 3 illustrate a segment switch unit comprising separate disconnect and shorting switches, other type of the segment switch units may be used. One non-limiting example is a three pole type segment switch unit 400 as illustrated in FIG. 4. As shown in FIG. 4, the segment switch unit 400 of a power transmission system (such as 100) includes first, second, and third poles 402, 404, and 406 such that the disconnect and shorting switch elements are combined in an integral switch. In some embodiments where three pole segment switch units are used, the first pole 402 of the segment switch unit 400 may be switched to couple to either the second pole 404 or the third pole 406. As shown in FIG. 4, the first pole 402 is not connected to the third pole 406 and therefore a short circuit path is either removed or not created. Embodiments where the coupling is to the second pole 404 (shown in FIG. 4) may result in connecting a segment 408 of a DC cable (such as 108) to the rest of the power transmission system. Embodiments where the coupling is to the third pole 406 (not shown in FIG. 4) may result in providing a short circuit path for the power received at a terminal 410 of the segment switch unit 400. In this embodiment, the first pole 402 is not connected to the second pole 404 and therefore the segment 408 is electrically decoupled from the rest of the power transmission system. The segment switch units 400 thus integrates the functionalities of both the shorting and disconnect switch elements into a single three pole-based switch, instead of using separate two pole type disconnect and shorting switch elements like those shown in FIGS. 2 and 3.

Figure 5:
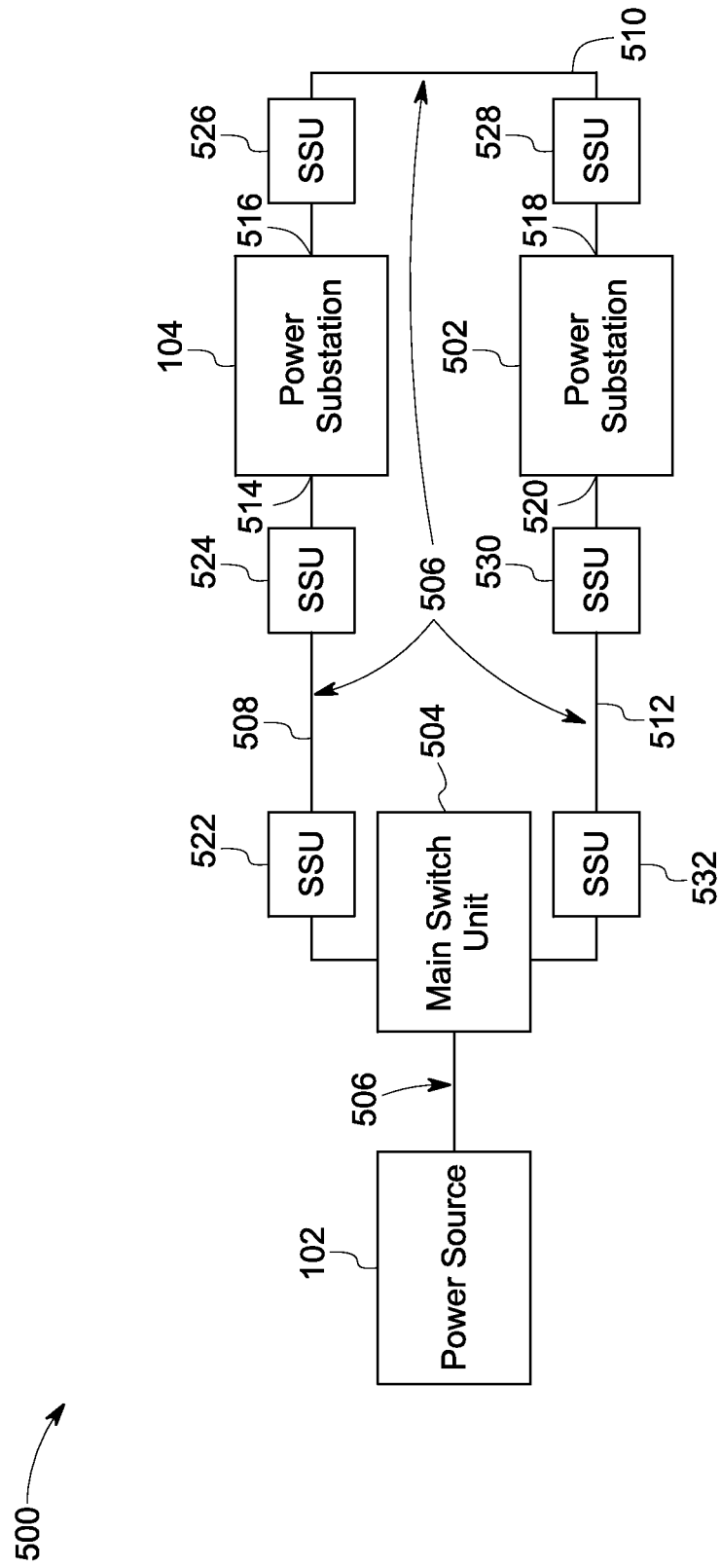
FIG. 5 is a block diagram of a power transmission system for transmitting electrical power from the power source to the first power substation and a second power substation, in accordance with one embodiment.
Figure 6:
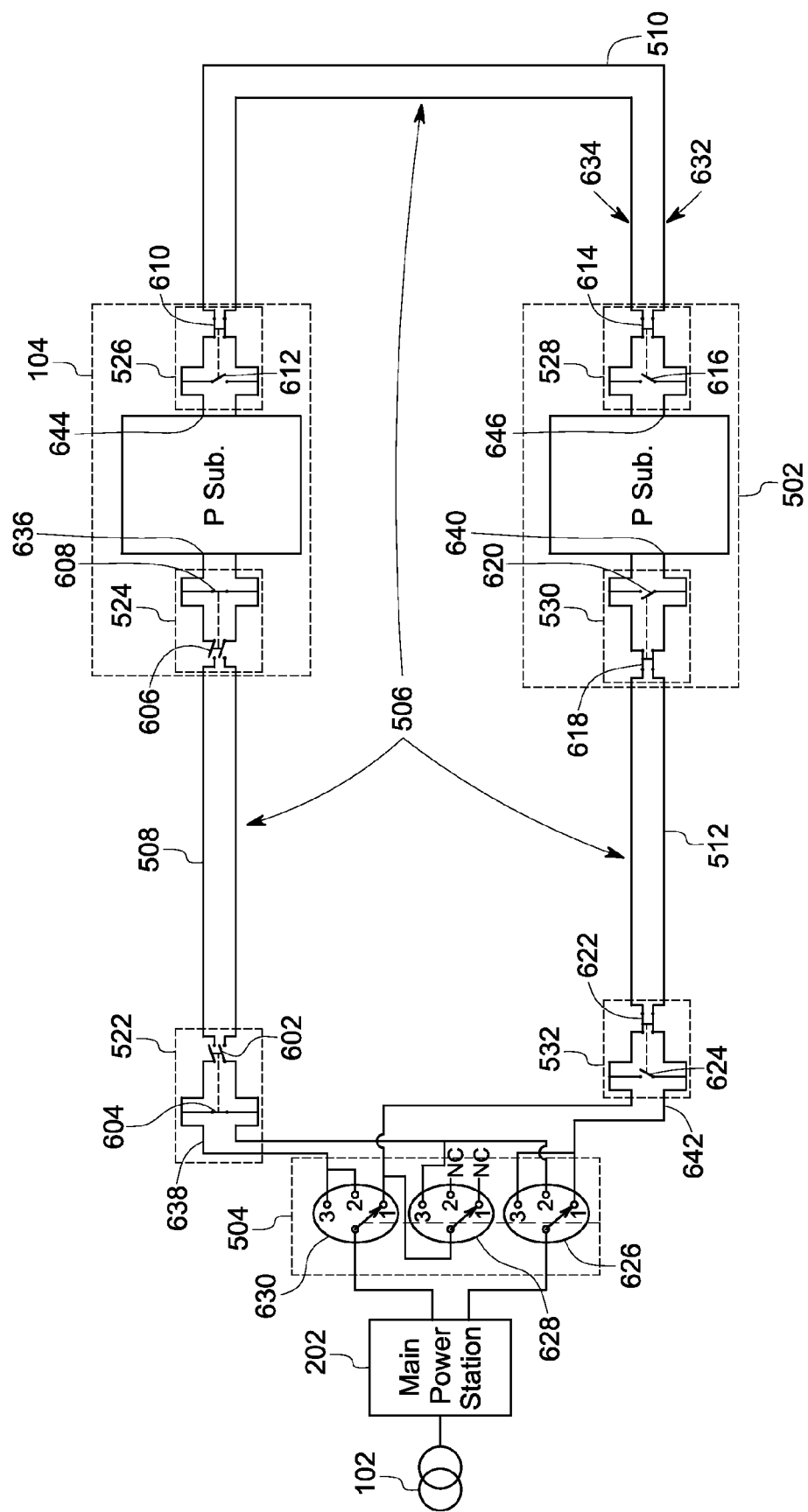
FIG. 6 is a schematic representation of the power transmission system of FIG. 5 in the event of the fault in a first segment of a DC cable.

FIGS. 1-3 illustrate embodiments including a single power substation, that is, the power substation 104. FIGS. 5-14 illustrate embodiments including a plurality of power substations. FIG. 5 is a block diagram of a power transmission system 500 for transmitting electrical power from the power source 102 to the first power substation 104 and a second power substation 502, in accordance with one embodiment. As shown in FIGS. 5 and 6, the second power substation 502 is disposed between the first power substation 104 and a main switch unit 504 of the power transmission system 500. The power transmission system 500 further includes a DC cable 506 that may be configured to carry power from the power source 102 to the first and second power substations 104 and 502 either directly or through a rectifier (such as the rectifier 106 of FIG. 1) or the main power station 202. The configuration and functionality of the DC cable 506 may be similar to that of the DC cable 108. In the example shown in FIGS. 5 and 6, the DC cable 506 includes a first segment 508, a second segment 510, and a third segment 512.

In one embodiment, the main switch unit 504 is electrically coupled between the power source 102 and the first and second power substations 104 and 502. In the embodiments shown in FIGS. 5 and 6, the first segment 508 electrically couples the main switch unit 504 to a first end 514 of the first power substation 104, the second segment 510 electrically couples a second end 516 of the first power substation 104 to a first end 518 of the second power substation 502, and the third segment 512 electrically couples a second end 520 of the second power substation 502 to the main switch unit 504. The network formed by this arrangement is similar to a ring network.

In some embodiments, the first, second and third segments 508, 510, and 512 individually or in combination form the paths to route the power to the first and second power substations 104 and 502. In one embodiment, the main switch unit 504 determines the path for routing the power to the first and second power substations 104 and 502 in the event of a fault in one of the segments 508, 510 and 512.

In some embodiments, as shown in FIGS. 5 and 6, the power transmission system 500 further includes a pair of first segment switch units 522 and 524 electrically coupled to the first segment 508, a pair of second segment switch units 526 and 528 electrically coupled to the second segment 510, and a pair of third segment switch units 530 and 532 electrically coupled to the third segment 512. The structure and functionality of the segment switch units of FIGS. 5-6 are similar to those of the segment switch units described above in conjunction with FIGS. 1-4.

In the event of the fault event in the first segment 508, the first segment switch units 522 and 524 may be used to disconnect the faulty segment 508 and create a short circuit path as illustrated in FIG. 6. Similarly, upon a fault event in the third segment 512, the third segment switch units 530 and 532 may be used to disconnect the faulty segment 512 and create a short circuit path (not shown). Likewise, in the event of the fault in the second segment 510, the second segment switch units 526 and 528 may be configured to disconnect that segment and create a short circuit path (not shown).

In order to fully operate the first and second power substations 104 and 502 in the embodiment of FIGS. 5-6, at least two of the segments 508, 510, and 512 must be operational. Examples are provided below of various fault responses when one of the segments 508, 510, and 512 is faulty and the other two are not. In a similar manner as described above with respect to FIGS. 1-3, once the faulty segment is either replaced with a new segment or repaired for re-use, the pair of segment switch units associated with the faulty segment may be configured to electrically connect the replaced or repaired segment to the power transmission system 500 so that the power can be routed through the replaced/repaired segment.

In some embodiments, the main switch unit 504 may be configured to route the power from the power source 102 to the first power substation 104 and the second power substation 502 via the operational segments, which will differ depending upon the faulty segment. Routing of power by the main switch unit 504 may be performed simultaneous with or subsequent to the disconnection of the faulty segment, creation of the short circuit path, and connection of the operational segments.

FIG. 6 is a schematic representation of the fully operational power transmission system 500 in the event of the fault in the first segment 508. The power transmission system 500 includes the main power station 202 as described above in conjunction with FIGS. 2 and 3. The first and second segment switch units 524 and 526 may be located either within (shown in FIG. 6) or in proximity to (as shown in FIG. 5) the first power substation 104. Similarly, the second and third segment switch units 528 and 530 may be located either within or in proximity to the second power substation 502.

Each segment switch unit may include a combination of a disconnect switch element and a shorting switch element. As shown in FIG. 6, the first segment switch unit 522 includes a disconnect switch element 602 and a shorting switch element 604, the first segment switch unit 524 includes a disconnect switch element 606 and a shorting switch element 608, the second segment switch unit 526 includes a disconnect switch element 610 and a shorting switch element 612, the second segment switch unit 528 includes a disconnect switch element 614 and a shorting switch element 616, the third segment switch unit 530 includes a disconnect switch element 618 and a shorting switch element 620, and the third segment switch unit 532 includes a disconnect switch element 622 and a shorting switch element 624. In alternative embodiments, the segment switch units may be of the type shown in FIG. 4, for example. In another alternative embodiment (not shown), a single segment switch unit may be used in one or more of the segments 508, 510, and 512.

In some embodiments, disconnect and shorting switch elements of the same segment switch unit may be configured to be triggered simultaneously (as shown by dotted lines connecting disconnect and shorting switch elements). In other embodiments, to avoid or reduce an arc flash, it may be useful to trigger the shorting switch element to provide a short circuit path prior to causing the disconnect switch element to disconnect the respective segment. In the embodiment of FIG. 6, the disconnect switch elements such as the disconnect switch elements 602 and 606 in the pair of segment switches such as the first segment switches 522 and 524, respectively may be configured to electrically disconnect the respective faulty segment such as the faulty segment 508. In the embodiment of FIG. 6, the disconnect switch elements 618, 622, 610 and 614 are configured to be in the closed positions to electrically connect the operational segments 510 and 512 to the power substations 104 and 502 of the power transmission system 500.

In the embodiment of FIG. 6, the DC cable 506 includes a first conducting path 632 and a second conducting path 634.

The first and second conducting paths 632 and 634 may be structurally and functionally similar to the first and second conducting paths 224 and 226, respectively, of FIG. 3. The embodiments for routing of the power to the first and second power substations 104 and 502 through the first conducting path 632 and the provision of short circuit paths through the second conducting path 226 defined by the shorting switch elements may be similar to those described above in conjunction with FIG. 3. Specifically, in the event of a fault on the first segment 508 as shown in FIG. 6, the shorting switch element 608 provides a short circuit path for the power received at its terminal 636, and the shorting switch element 604 provides a short circuit path for the power received at its terminal 638. In this embodiment, the disconnect switch elements of the other segments are in closed positions so as to keep those segments connected and the shorting switch elements are in open positions so as to not short those segments. In this manner, power from the power source 102 can still reach the first power substation 104 through the third and second segments 512 and 510, and the second power substation 502 through the third segment 512.

In a similar manner, if a fault occurs on the third segment 512 while the segments 508 and 510 are operational, then the first and second power substations 104 and 502 may still receive power through those operational segments. If instead the fault occurs on the second segment 510 while the other segments are operational, then the faulty segment 510 is isolated with the first and second power substations 104 and 502 receiving the power directly through the first and third segments 508 and 512, respectively. In this embodiment with the faulty segment 510, it is useful to short the shorting switch elements 612 and 616 at terminals 644 and 646, respectively, and to trigger the disconnect switch elements 610 and 614 to disconnect the faulty segment 510.

In the embodiment of FIG. 6, the main switch unit 504 includes three pole three position switches, that is, main switches 626, 628, and 630. When the first segment 508 is faulty, the main switches 626, 628, and 630 may be configured to be switched to position "1" simultaneously. Position "1" in the main switch 626 facilitates in providing a first path for the power to the first power substation 104 through the operational segment 512, and further through the operational segment 510, while bypassing the faulty segment 508. In the event of a fault in the third segment 512, the main switches 626, 628 and 630 may be switched to position "2," which will result in the power to be routed to the first power substation 104 through the first segment 508, and to the second power substation 502 through the first segment 508 and further through the second segment 510. In the event that the second segment 510 is the faulty segment, the main switches 626, 628 and 630 may be configured to be switched to position "3" to result in the power to be routed to the first power substation 104 through the first segment 508 and to the second power substation 502 through the third segment 512.

It will be apparent to one of ordinary skill in the art that although FIG. 6 illustrates three pole three position-based main switch unit 504; other type of the main switch unit 504 may be used. One non-limiting example is a three pole four position type of switch. In embodiments where three pole four position main switches are used, one position in each of the three main switches may not be used, for example, kept "NC." Similar to the main switch unit 110, the main switch unit 504 may be implemented at either the main power station 202, the power source 102, or at any other platform in the power transmission system 500. The main switch unit 504 may further comprise an on-load switch unit or an off-load switch unit.

Figure 7:
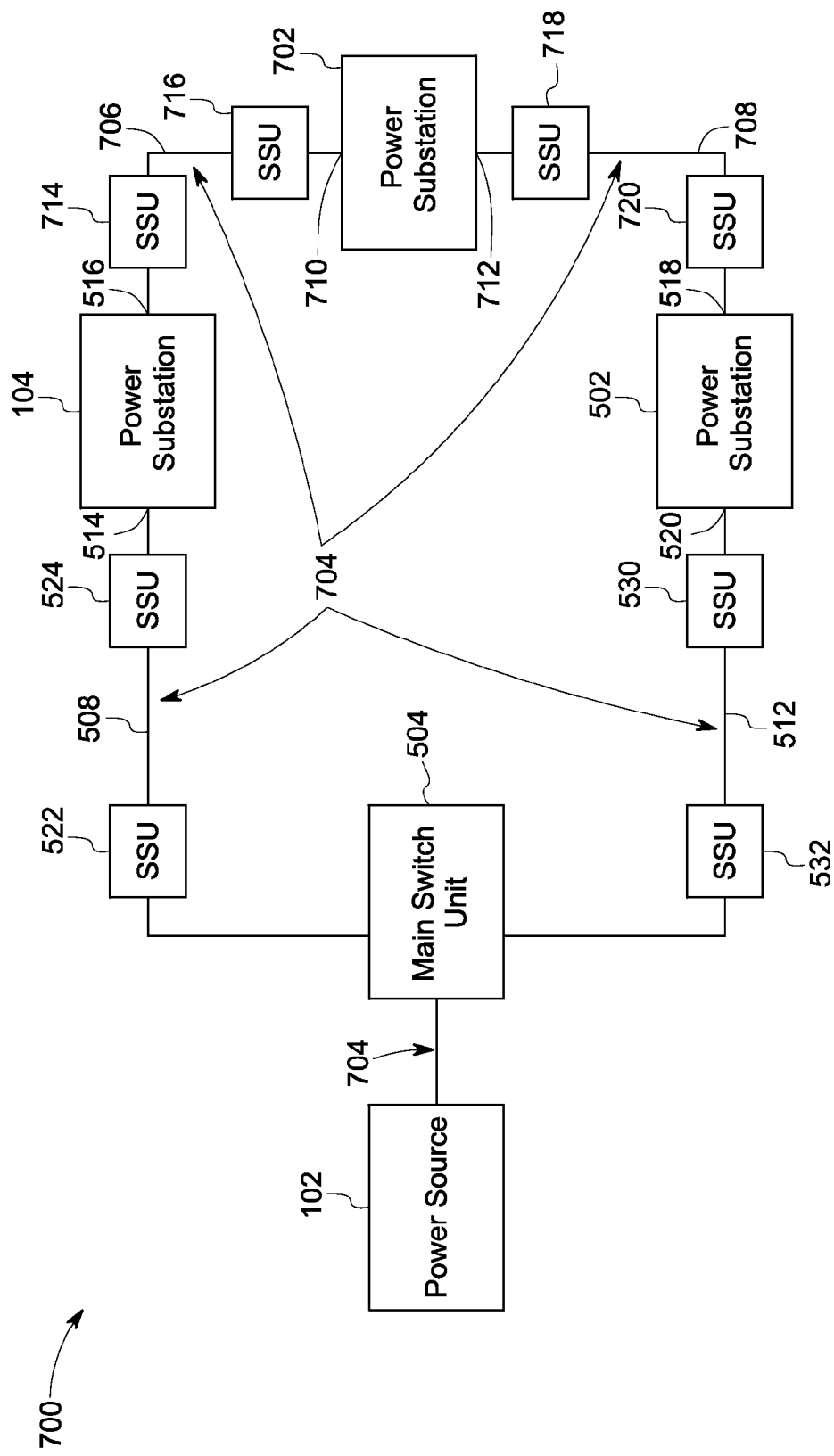
FIG. 7 is a block diagram of a power transmission system for transmitting power from the power source to first, second, and third power substations, in accordance with one embodiment.

FIGS. 7-10 illustrate embodiments wherein three power substations are present in a power transmission system 700. FIG. 7 is a block diagram of the power transmission system 700 for transmitting power from the power source 102 to the first, second, and third power substations 104, 502, and 702, in accordance with one embodiment. As shown in FIGS. 7-10, the third power substation 702 is disposed between the first and second power substations 104 and 502. The power transmission system 700 further includes a DC cable 704 that is configured to carry power from the power source 102 to the first, second, and third power substations 104, 502, and 702. The configuration and functionality of the DC cable 704 may be similar to that of the DC cable 108. In some embodiments as shown in FIGS. 7-10, the DC cable 704 includes the first segment 508, a second segment 706, the third segment 512, and a fourth segment 708. In the embodiment of FIG. 7, the second segment 706 electrically couples the second end 516 of the first power substation 104 to a first end 710 of the third power substation 702, and the fourth segment 512 electrically couples a second end 712 of the third power substation 702 to the first end 518 of the second power substation 502. The network formed by this arrangement is similar to a ring network.

In one embodiment, the first, second, third, and fourth segments 508, 706, 512, and 708, individually or in combination, are used as the paths to route the power to the first, second, and third power substations 104, 502, and 702. In some embodiments, the main switch unit 504 may be used to facilitate the routing of the power to the first, second, and third power substations 104, 502 and 702.

In one embodiment, the power transmission system 700 includes the pair of first segment switch units 522 and 524, a pair of second segment switch units 714 and 716 electrically coupled to the second segment 706, the pair of third segment switch units 530 and 532, and a pair of fourth segment switch units 718 and 720 electrically coupled to the fourth segment 708. The functionalities and configurations of the various segment switch units may be similar to those of the switch units discussed with respect to FIGS. 1-6. One difference is that, for embodiments with more than two power substations, depending upon the locations of the faults, in some situations several power substations (though likely not all power substations) may still be operable in the event that multiple segments become faulty at one time.

In an example wherein the second segment 706 is faulty, the power may be routed to the first power substation 104 through the operational segment 508, routed to the second power substation 502 through the operational segment 512, and routed to the third power substation 702 through the operational segment 512 and through the operational segment 708. As another example, in order to isolate the fourth segment 708, the power may be routed to the first power substation 104 through the operational segment 508, routed to the second power substation 502 through the operational segment 512, and routed to the third power substation 702 through the operational segment 508 and through the operational segment 706. As still other examples, if the first segment 508 is faulty, the power may be routed to the first, second and third power substations 104, 502 and 702 using the segments 512, 708, and 706. Similarly, if the third segment 512 is faulty, the power may be routed to the first, second and third power substations 104, 502 and 702 using the segments 508, 706, and 708. In certain embodiments wherein two segments are faulty, for example, if the segments 508 and 706 are faulty, power may still be supplied to the second power substation 502 through the third segment 512 and to the third power substation 702 through the segments 512 and 708.

Figure 8:
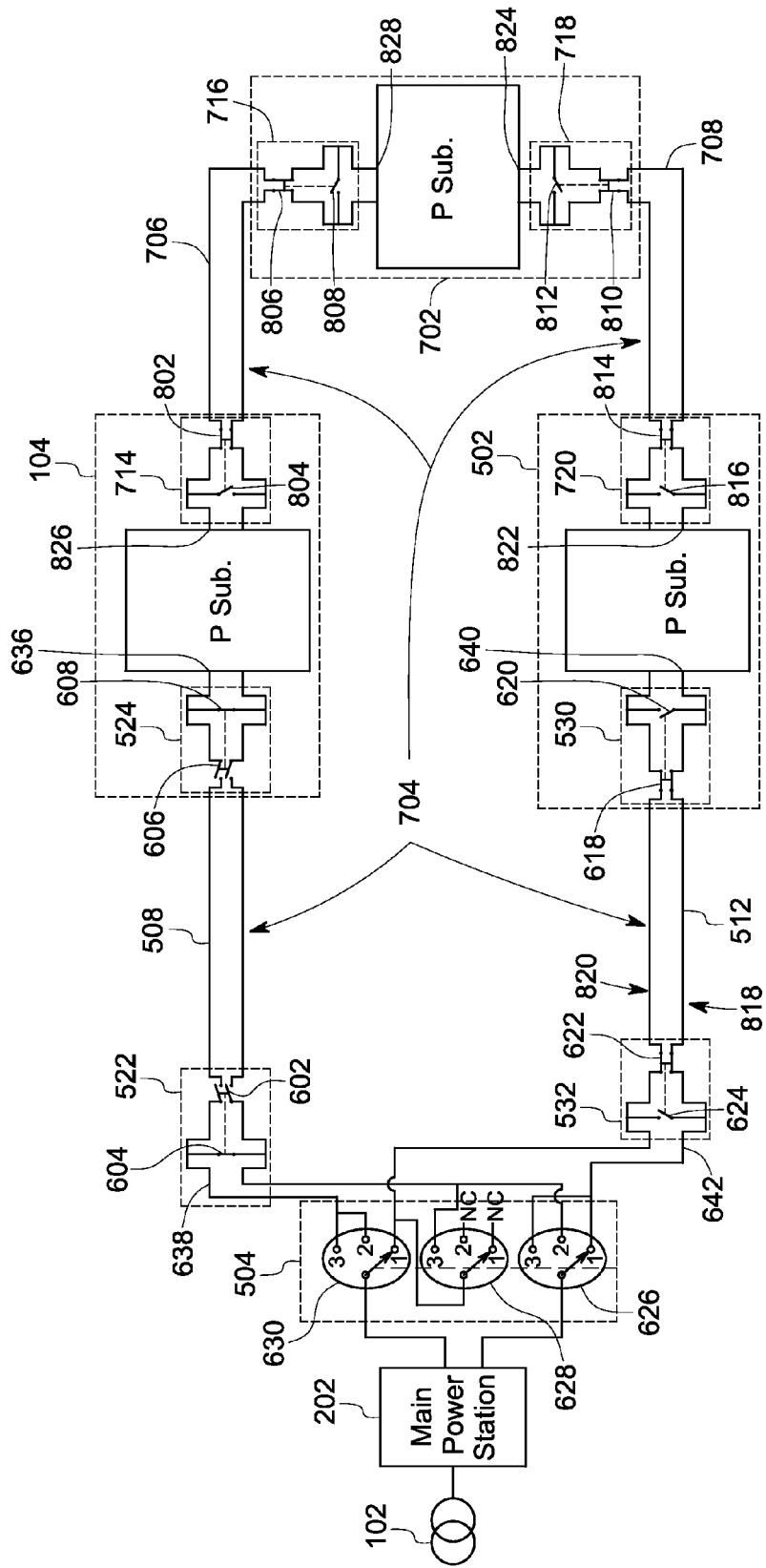
FIG. 8 is a schematic representation of the power transmission system of FIG. 7 in the event of the fault in a first segment of a DC cable.

FIG. 8 is a schematic representation of the fully operational power transmission system 700 in the event of the fault in the first segment 508. In FIG. 8, the second segment switch unit 714 includes a disconnect switch element 802 and a shorting switch element 804, the second segment switch unit 716 includes a disconnect switch element 806 and a shorting switch element 808, the fourth segment switch unit 718 includes a disconnect switch element 810 and a shorting switch element 812, and the fourth segment switch unit 720 includes a disconnect switch element 814 and a shorting switch element 816. In the embodiment shown in FIGS. 8-10, the DC cable 704 includes a first conducting path 818 and a second conducting path 820. The first and second conducting paths 818 and 820 may be structurally and functionally similar to the first and second conducting paths 224 and 226, respectively. The embodiments for the provision of short circuit paths through the second conducting path 820 defined by the shorting switch elements, and the routing of the power to the first, second, and third power substations 104, 502 and 702 through the first conducting path 818 may be similar to those described above in conjunction with FIGS. 2 and 3.

Figure 9:
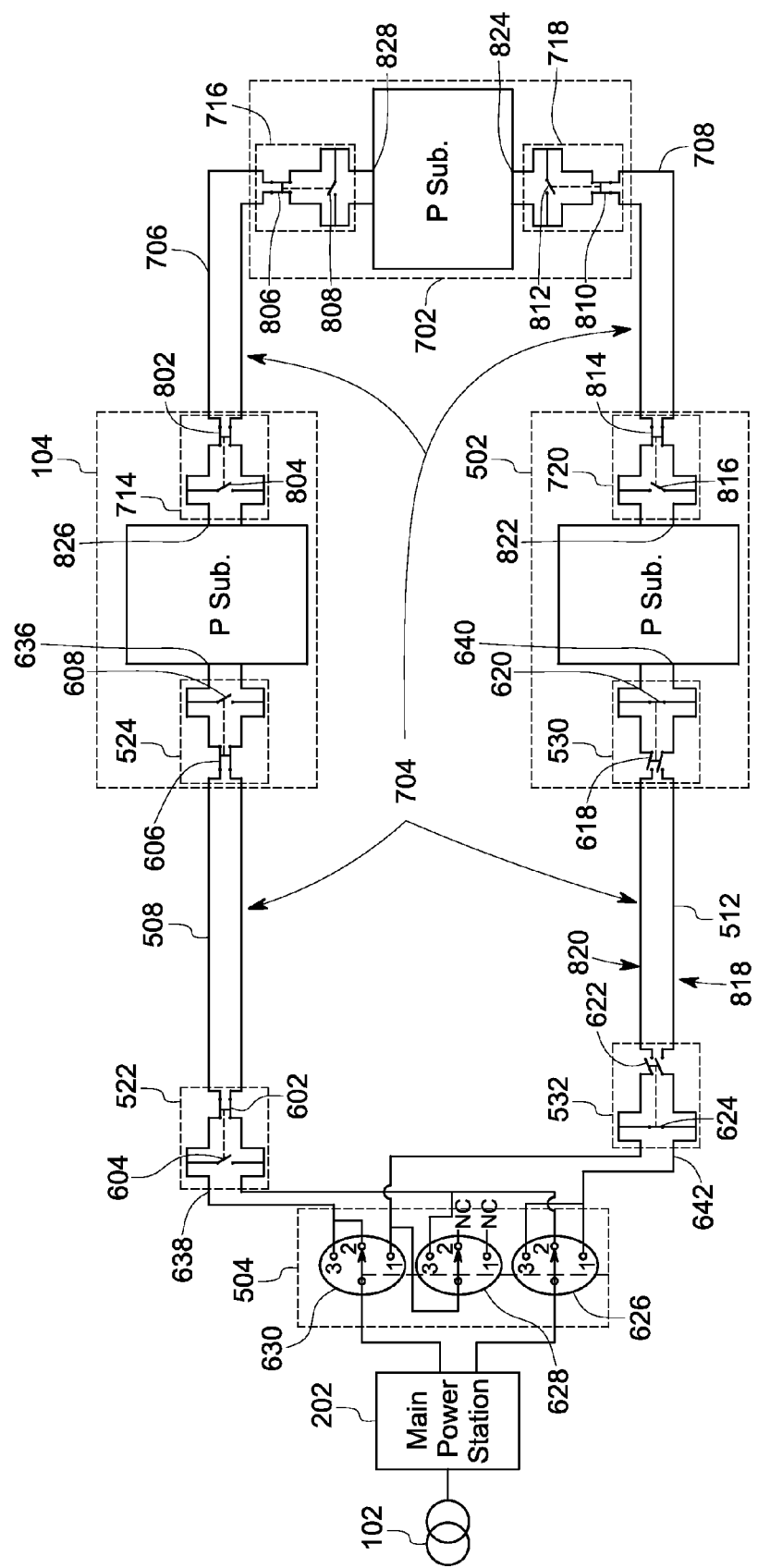
FIG. 9 is a schematic representation of the power transmission system of FIG. 7 in the event of the fault in a third segment of the DC cable.

In the event of the fault in the first segment 508 of the power transmission system 700, the shorting switch elements associated with the faulty segment 508 prevent the power to be routed to the faulty segment 508, and the disconnect switch elements cause the faulty segment 508 to be disconnected. The rest of the disconnect switch elements in the power transmission system 700 are configured to be in the closed positions to electrically connect the operational segments 512, 706, and 708 to the rest of the power transmission system 700, if not already in the closed positions. Also, the rest of the shorting switch elements are in the open positions, if not already open. The main switch unit 504 may further be used to route power using the operational segments 512, 708 and 706 (position "1"). In the event of a fault in the third segment 512, as illustrated in FIG. 9, the shorting switch elements associated with the faulty segment 512 prevent the power to be routed to the faulty segment 512, and the disconnect switch elements cause the faulty segment 512 to be disconnected. The rest of the disconnect switch elements in the power transmission system 700 are configured to be in the closed positions if not already closed, and the rest of the shorting switch elements are in the open positions if not already open. The main switch unit 504 may further be used to route power using the operational segments 508, 706 and 708 (position "2").

Figure 10:
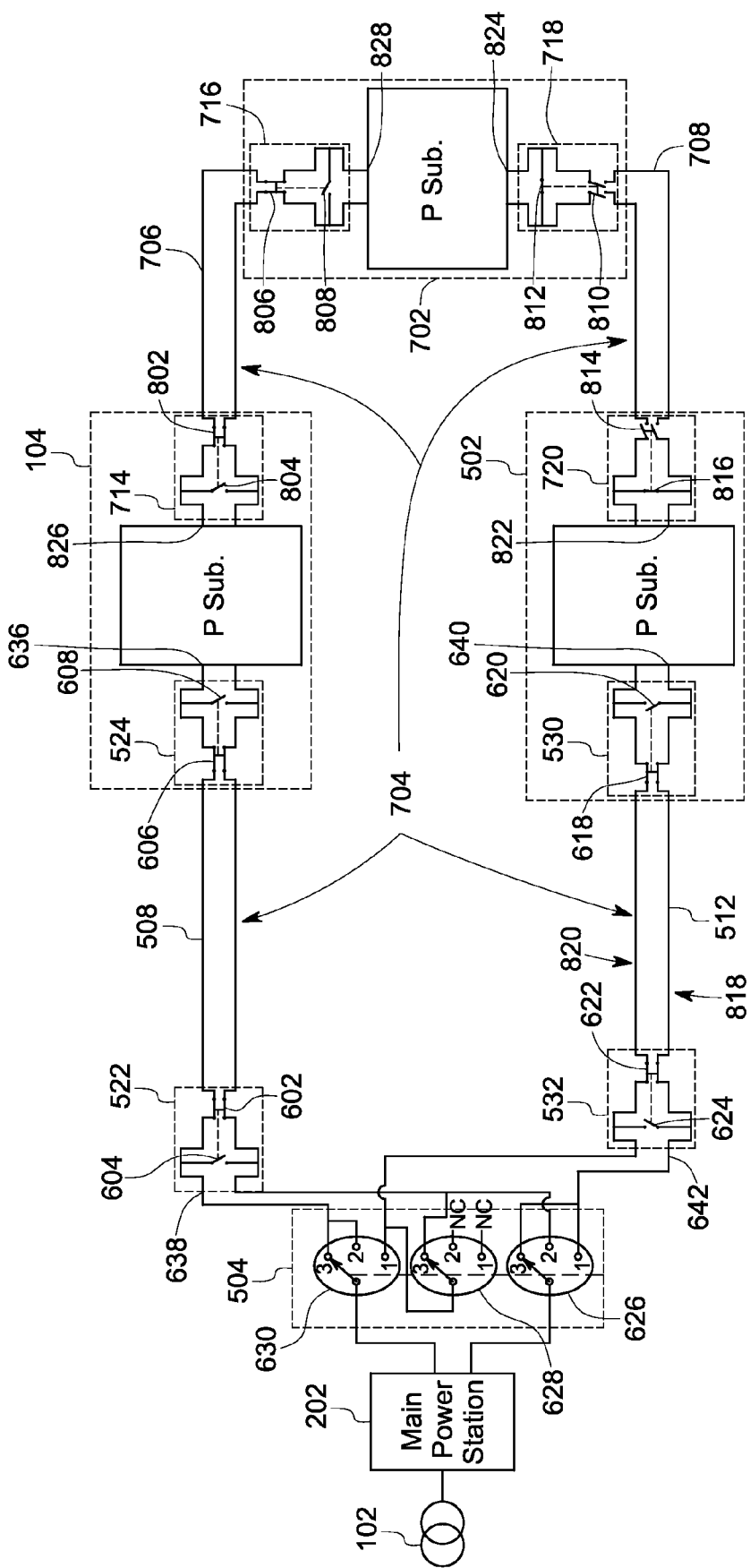
FIG. 10 is a schematic representation of the power transmission system of FIG. 7 in the event of the fault in a fourth segment of the DC cable.

In the event that the fourth segment 708 is the faulty segment, as shown in FIG. 10, short circuit paths may be created for the power received at a terminal 822 by the shorting switch element 816 and at a terminal 824 by the shorting switch element 812. In a similar manner as discussed above, the disconnect switch elements 810 and 814 are configured to be in the open positions to electrically disconnect the faulty segment 708, the rest of the disconnect switch elements in the power transmission system 700 are in the closed positions, and the rest of the shorting switch elements are in the open positions. In one embodiment, the main switches 626, 628 and 630 may be configured to be switched to position "3" simultaneously. Switching to position "3" results in the power to be routed to the first, second, and third power substations 104, 502 and 702 as described above in conjunction with FIG. 7.

In the event that the second segment 706 is the faulty segment (not shown), short circuit paths may be provided for the power received at a terminal 826 of the shorting switch element 804 and at a terminal 828 of the shorting switch element 808, the disconnect switch elements 802 and 806 may be configured to be in the open positions to electrically disconnect the faulty segment 706, the rest of the disconnect and shorting switch elements may be configured to be closed and opened, respectively, and the main switches 626, 628 and 630 may be switched to position "3," for example.

Upon repair or replacement of a faulty segment, the normal operation of the power transmission system 700 may be resumed.

FIGS. 1-3 and 5-10 illustrate different embodiments of a power transmission system in the event of the fault in any of the cable segments. As mentioned earlier, the power transmission system (such as 100, 500, or 700) may be a DC power transmission system used across various applications, for example, subsea processing for oil and gas industry and offshore wind power production.

A modular stacked DC (MSDC) architecture may be well suited for subsea applications requiring transmission and distribution over long distances. The MSDC architecture may use several DC-DC power converter modules stacked and connected in series, both at transmitting and receiving ends of the power transmission system. Unlike other DC transmission systems, for example where a DC transmission link voltage is controlled, a dc transmission link current may be controlled in the MSDC architecture. The current-controlled MSDC architecture may be based on insulated gate bipolar transistors (IGBTs), thyristors such as integrated gate commutated thyristors (IGCTs), or the like. Moreover, the power converter modules may be coupled in series and hence can be short-circuited easily in the event of a fault. The series-coupled power converter modules may result in reduction or elimination of DC circuit breakers when used in a current-controlled HVDC system. Also, the current-controlled HVDC system may provide a simpler configuration of a plurality of HVDC power stations and substations in any network topology such as, but not limited to, ring, star, mesh or hybrid. Moreover, such a design may be less expensive and more flexible than the conventional voltage-controlled HVDC systems.

FIG. 11 illustrates an embodiment where the DC power transmission system is used in a subsea application. FIG. 11 is a schematic representation of a subsea DC power transmission system 1100 (hereinafter interchangeably referred to as the "system 1100" for the ease of reference) for transmitting power from the power source 102 to the first, second, and third power substations 104, 502 and 702, in accordance with one embodiment. In the specific embodiment illustrated in FIG. 11, the main switch unit 504, the first segment switch unit 522 and the third segment switch unit 532 are positioned in the main power station 202, and the other switch units are positioned within respective power substations. In one embodiment, as shown in FIG. 11, an onshore system 1102 includes the power source 102 and an optional rectifier 106. Alternatively, in another embodiment (not shown), the power source 102 may be located offshore. Similarly, although the main power station 202 is shown as being offshore in the embodiment of FIG. 11, in some embodiments, the main power station 202 may be onshore. In one embodiment in the oil and gas application, a gas turbine may be installed on an onshore or an offshore platform to act as the power source 102. In another embodiment, the power source 102 may include multiple power sources that are located both onshore and offshore. In such embodiments, in the event of a failure or a fault in the onshore power source, the power may be fed from the offshore power source.

Referring again to FIG. 11, in accordance with one embodiment, an offshore system 1104 includes the main power station 202, and the first, second and third power substations 104, 502 and 702 electrically connected to each other. In one embodiment, each power substation in the system 1100 includes a modular stacked power conversion system. In some embodiments as shown in FIG. 11, the first, second, and third power substations 104, 502, and 702 include sub modular stacked power conversion systems 1106, 1108 and 1110, respectively. Further, the sub modular stacked power conversion systems 1106, 1108 and 1110 include a plurality of sub power converter modules 1112, 1114 and 1116, respectively.

In some embodiments as shown in FIG. 11, where the intended loads are AC, the sub power converter modules 1112, 1114 and 1116 are DC-AC power converter modules that convert the DC power to AC power, which is used by the AC loads for operation. In one embodiment, each of these sub power converter modules 1112, 1114, and 1116 may be electrically coupled in series to the DC cable 704. In some other embodiments, the sub modular stacked power conversion system 1106, 1108 or 1110 may further optionally include several DC-DC power converter modules (not shown in FIG. 11) stacked and connected in series. These DC-DC power converter modules may be electrically coupled to the DC-AC sub power converter modules 1112, 1114, and 1116. In another embodiment, where the load is a DC load, the DC-DC power converter modules may be electrically connected in series to the DC cable 704 without inclusion of the DC-AC sub power converter modules.

Each power substation may include at least one load electrically coupled to some or all the sub power converter modules in the respective sub modular stacked power conversion system. An exemplary embodiment as shown in FIG. 11 illustrates the first power substation 104 as including loads 1118 electrically coupled to the sub power converter modules 1112. The exemplary embodiment also illustrates the second power substation 502 to include loads 1120 electrically coupled to the sub power converter modules 1114. FIG. 11 further illustrates the third power substation 702 as including loads 1122 electrically coupled to the sub power converter modules 1116. The connection of a single load to multiple power converter modules may facilitate in providing a failover support to a DC transmission system such as the system 1100. The failover support may be provided by operating a load through an operational power converter module when one or more other power converter modules connected to the same load are faulty.

In some embodiments, the sub modular stacked power conversion systems 1106, 1108 and 1110 may be each configured such that the power flows through the DC cable 704 to the first, second and third power substations 104, 502 and 702 in both the directions. In one embodiment, the bi-directional power flow may be achieved by electrically coupling one or more terminals of some of the sub power converter modules 1112 in series to the first conducting path 818, and the rest of the terminals of the sub power converter modules 1112 in series to the second conducting path 820. The wired interconnections of the terminals of the sub power converter module 1112, 1114, or 1116 are illustrated in FIG. 11. A first configuration achieved through the inter-connections of the terminals of the sub power converter module 1112, 1114, or 1116 may facilitate in routing power in one direction (shown by arrows), for example, through the first conducting path 818. Similarly, a second configuration may facilitate in routing power in the opposite direction (shown by arrows), for example, through the second conducting path 820. In some embodiments as shown in FIG. 11, the electrical coupling to the first conducting path 818 may result in the power to flow from the third segment 512 via the second power substation 502 to the fourth segment 708, which may then relay the power to the second segment 706 via the third power substation 702. The power from the second segment 706 may be further relayed to the first power substation 104. Similarly, in some other embodiments, the electrical coupling to the second conducting path 820 may facilitate in providing the short circuit paths as have been described above in conjunction with FIG. 8.

Alternatively, in embodiments where the direction of power flow is to be reversed, for example, as described earlier in conjunction with FIG. 9 where the third segment 512 is faulty, the electrical coupling to the first conducting path 818 may result in the power to flow from the first segment 508 via the first power substation 104 to the second segment 706. The second segment 706 may then relay the power to the fourth segment 708 via the third power substation 702. The power from the fourth segment 708 may be further relayed to the second power substation 502. Thus, the system 1100 may facilitate power to flow through the cable segments bi-directionally. Similarly, in some other embodiments, the electrical coupling to the second conducting path 820 may facilitate in providing the short circuit paths as have been described above in conjunction with FIG. 9.

In one embodiment, the configuration of the sub power converter modules 1112, 1114, and 1116 may be reversed such that normal power flow may occur through the second conducting path 820 and the short circuit paths may be provided through the first conducting path 818.

The main power station 202 may include an additional ("main") modular stacked power conversion system 1124 including a plurality of additional ("main") power converter modules 1126 and 1128, in accordance with some embodiments. The configurations and functionalities of the main modular stacked power conversion system 1124 may be similar to that of the modular stacked power conversion system 1106, 1108 or 1110. However, the main power converter modules 126 of the main modular stacked power conversion system 1124 may be electrically coupled to a pole 1130 of the main switch 626, and the main power converter modules 1128 may be electrically coupled to a pole 1132 of the main switch 630. This configuration may facilitate in routing the power from the power source 102 to the pole 1130 via the main power converter modules 1126. This configuration may further enable receiving the power at the main power converter modules 1128 from the pole 1132 through the short circuit path created by the shorting switch element 608. Additionally, as shown in FIG. 11, a terminal of each module in the main power converter modules 1126 (or 1128) may be electrically connected to the adjacent ones of the main power converter modules 1126 (or 1128). In the embodiment of FIG. 11, a terminal 1134 of the main power converter module 1126 and a terminal 1140 of the main power converter module 1128 are electrically connected to respective first and second terminals 1136 and 1142 of the rectifier 106 via a fifth segment 1138 of the DC cable 704.

In embodiments where the power flow is reversed, for example, as described earlier in conjunction with FIG. 9 where the third segment 512 is faulty, the electrical coupling to the pole 1132 may result in routing the power from the power source 102 to the pole 1132 via the main power converter modules 1128. Also, in such embodiments, the electrical coupling may result in receiving the power at the main power converter modules 1126 from the pole 1130 through the short circuit path created by the shorting switch element 620. In some embodiments, the main power station 202 may also include one or more loads 1144 and 1146 electrically coupled to the main power converter modules 1126 and 1128.

Alternatively, in some embodiments, the reverse power flow may be achieved by using the sub modular stacked power conversion system (such as 1106, 1108, or 1110) to connect only one of the first and second conducting paths 818 and 820 of a segment to the respective conducting path of the other segment. For example, only the first conducting path 818 of the first segment 508 may be connected to the first conducting path 818 of the second segment 706 via the sub modular stacked power conversion system 1106. In this example, the second conducting path 820 of the first segment 508 may be connected directly to the second conducting path 820 of the second segment 706 through the DC cable 704, thereby bypassing the sub modular stacked power conversion system 1106.

Figure 12:
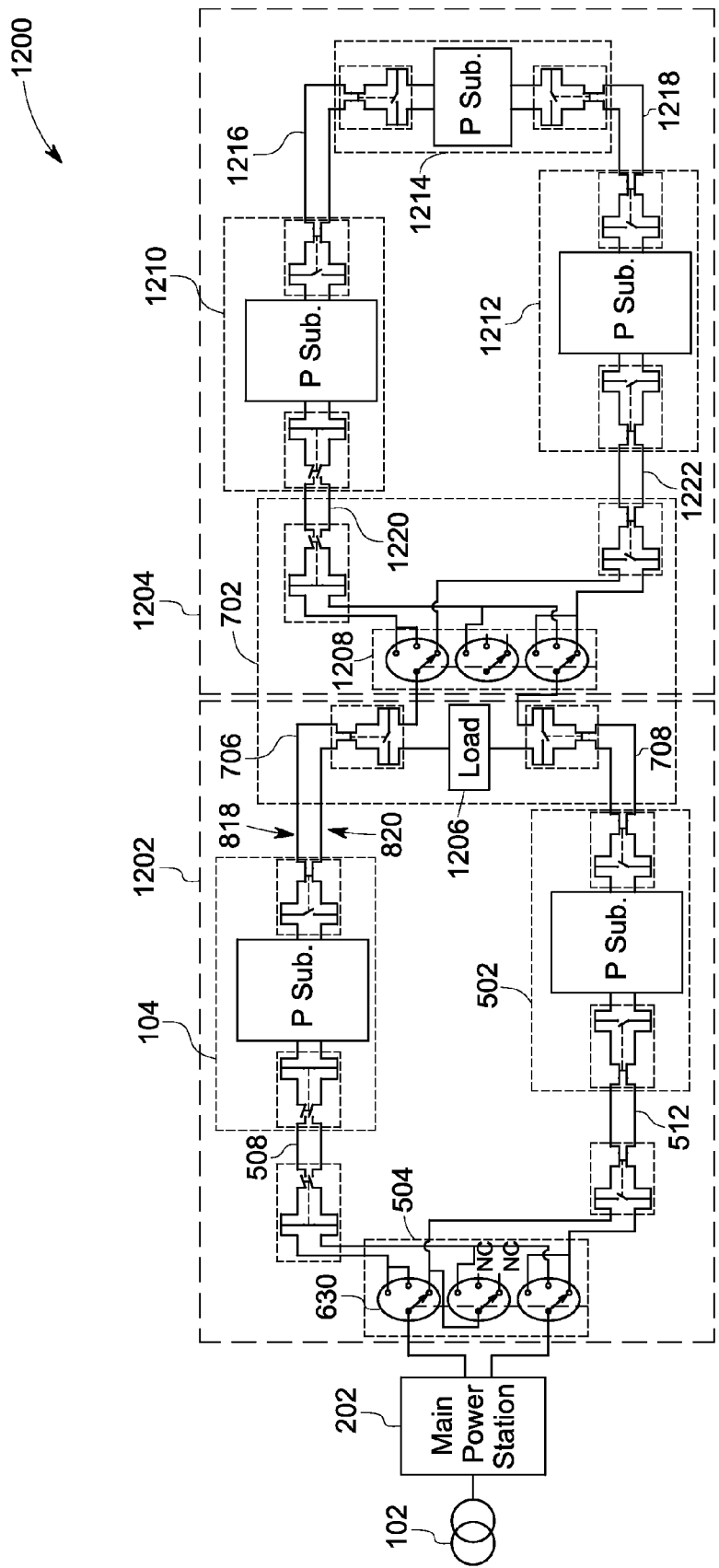
FIG. 12 illustrates a power transmission system depicting an extended star network topology of the power transmission system, in accordance with one embodiment.

FIGS. 1-3 and 5-11 are directed to a power transmission system depicting a ring topology. However, the invention is not limited to any specific type of network topology. The power transmission system (100, 500, 700, or 1100) may thus be any other type of network topology, such as, but not limited to, a star topology, a mesh topology, or a hybrid topology. FIG. 12 illustrates a power transmission system 1200 depicting an extended star network topology of the power transmission system 700 of FIG. 8, in accordance with one embodiment. The system 1200 is a cascaded system of two ring networks including first and second ring networks 1202 and 1204.

In some embodiments as shown in FIG. 12, the first ring network 1202 includes the first, second, and third power substations 104, 502, and 702 that are electrically coupled to the first main switch unit 504. The third power substation 702 is illustrated as including one or more loads 1206 connected in series to the second conducting path 820 as well as a second main switch unit 1208 for the second ring network 1204 electrically coupling the elements in the first ring network 1202 to elements in the second ring network 1204. In some embodiments, the loads 1206 may have the bypass capability such that in case of any fault in any of the loads 1206, the power may still flow across the system 1200 via the DC cable 704. Although not depicted in FIG. 12, the first and second power substations 104 and 502 may similarly include one or more loads like shown in FIG. 11. In one embodiment as shown in FIG. 12, the second main switch unit 1208 is electrically coupled to the first conducting path 818 of the second and fourth segments 706 and 708 on the side of the first ring network 1202. In some embodiments, the electrical couplings of the second main switch unit 1208 to the elements in the second ring network 1204 may be similar to the electrical couplings of the first main switch unit 504 to the first, second and third power substations 104, 502 and 702. Moreover, the functionality and structure of the switches in the second main switch unit 1208 may be similar to those of the main switch unit 504.

In one embodiment, the loads 1206 may be supplied power from the main switch 630 via the second conducting path 820. The power may thus flow through the second conducting path 820 of the third segment 512 and may be further routed through the second conducting path 820 of the fourth segment 708 to reach the loads 1206. In such embodiments, the second main switch unit 1208 receives the power from the first conducting path 818 of the fourth segment 708. In one embodiment, the second main switch unit 1208 may route the received power to fifth, sixth, and seventh power substations 1210, 1212 and 1214 in the second ring network 1204. In some embodiments, the configurations and functionalities of the fifth, sixth and seventh power substations 1210, 1212 and 1214 may be similar to those of the first, second and third power substations 104, 502 and 702, respectively.

In some embodiments, the second ring network 1204 may further include segments 1216 and 1218 of the DC cable 704, located between the adjacent pair of substations. Similarly, in some other embodiments, a segment 1220 of the DC cable 704 electrically couples the fifth power substation 1210 and the second main switch unit 1208, and a segment 1222 of the DC cable 704 electrically couples the sixth power substation 1212 and the second main switch unit 1208. In one embodiment, each of these segments may include a pair of segment switch units similar to the pair of segment switch units in the respective segments 508, 512, 706, and 708 described above in conjunction with FIGS. 7 and 8. The configuration of the second ring network 1204 may be similar to that of the ring network of FIG. 8. In the embodiment of FIG. 12, a fault event in one of the DC cable segments in the first ring network 1202 and in one of the segments in the second ring network 1204 may be handled simultaneously and may be managed in a manner that is similar to methods described above in conjunction with some of the embodiments of FIGS. 8-10. The cascading of the system 1200 may be extended to any number of cascaded ring networks.

Figure 13:
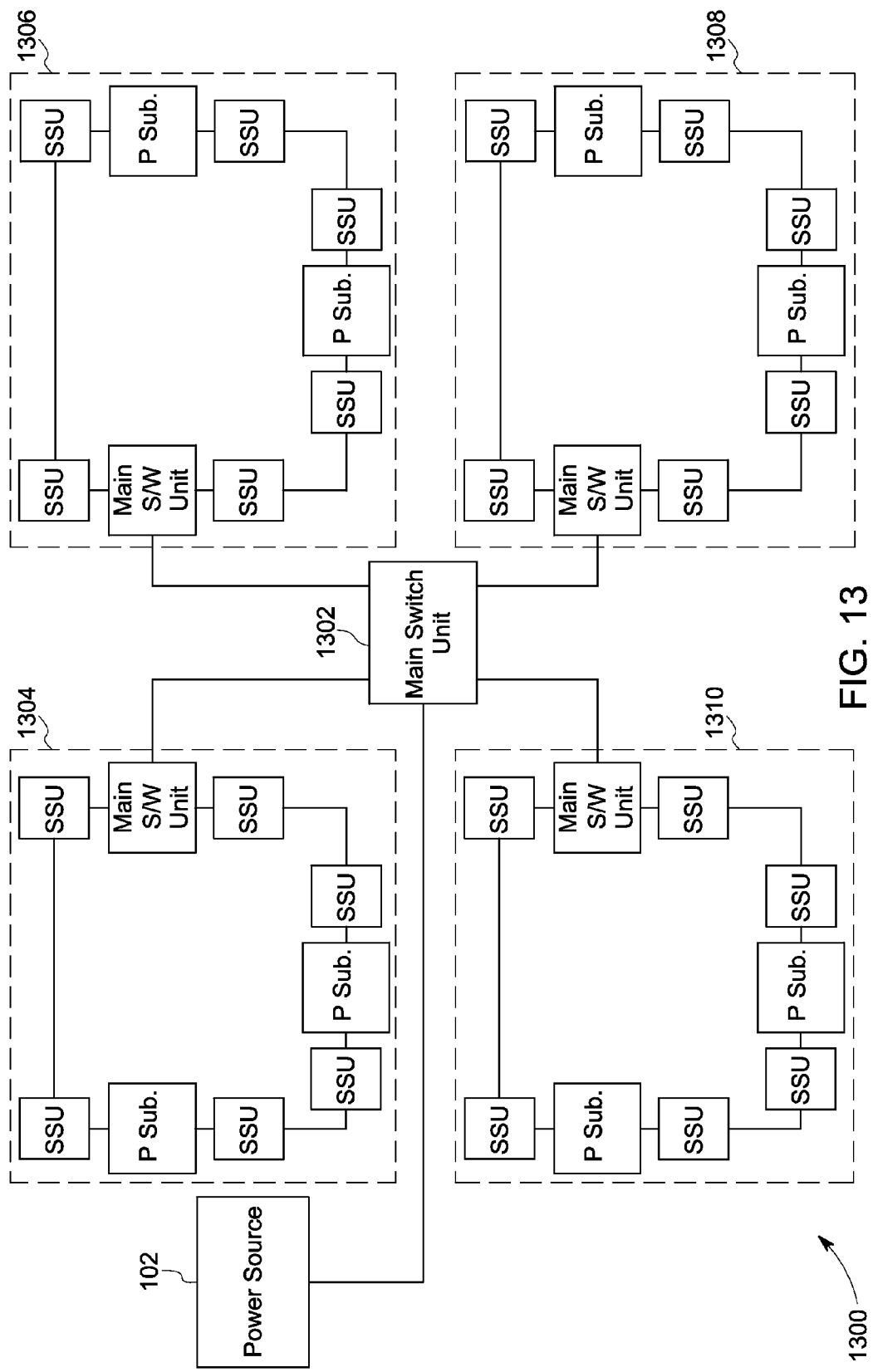
FIG. 13 illustrates a block diagram of a power transmission system depicting a star-ring network topology, in accordance with one embodiment.

FIG. 13 illustrates a block diagram of a power transmission system 1300 depicting one type of hybrid technology including a star-ring network, in accordance with one embodiment. Referring to FIG. 13, the system 1300 includes a main switch unit 1302 that acts as a central network element. In one embodiment of FIG. 13, the system 1300 further includes four ring networks such as 1304, 1306, 1308, and 1310. In some embodiments, the main switch unit 1302 may be configured such that it may be electrically connected to all the ring networks 1304, 1306, 1308 and 1310. The electrical connection may enable the power from the power source 102 to be fed to each of the four ring networks 1304, 1306, 1308 and 1310. In some other embodiments, the main switch unit 1302 may be configured to isolate one of the four ring networks 1304, 1306, 1308 and 1310, in the event of the fault in too many DC cable segments of that ring network. The ring network 1304, 1306, 1308 or 1310 may be same as the ring network illustrated in FIG. 5 or 7 with each ring network 1304, 1306, 1308 or 1310 including a corresponding main switch unit coupled to the central network element 1302. The main switch unit in each ring network 1304, 1306, 1308 or 1310 may operate in a similar manner as the main switch unit 504. Similar to the system 1200, the system 1300 may handle simultaneous fault events in multiple DC cable segments, such as fault events in a DC cable segment in each of the ring networks 1304, 1306, 1308 and 1310.

Figure 14:
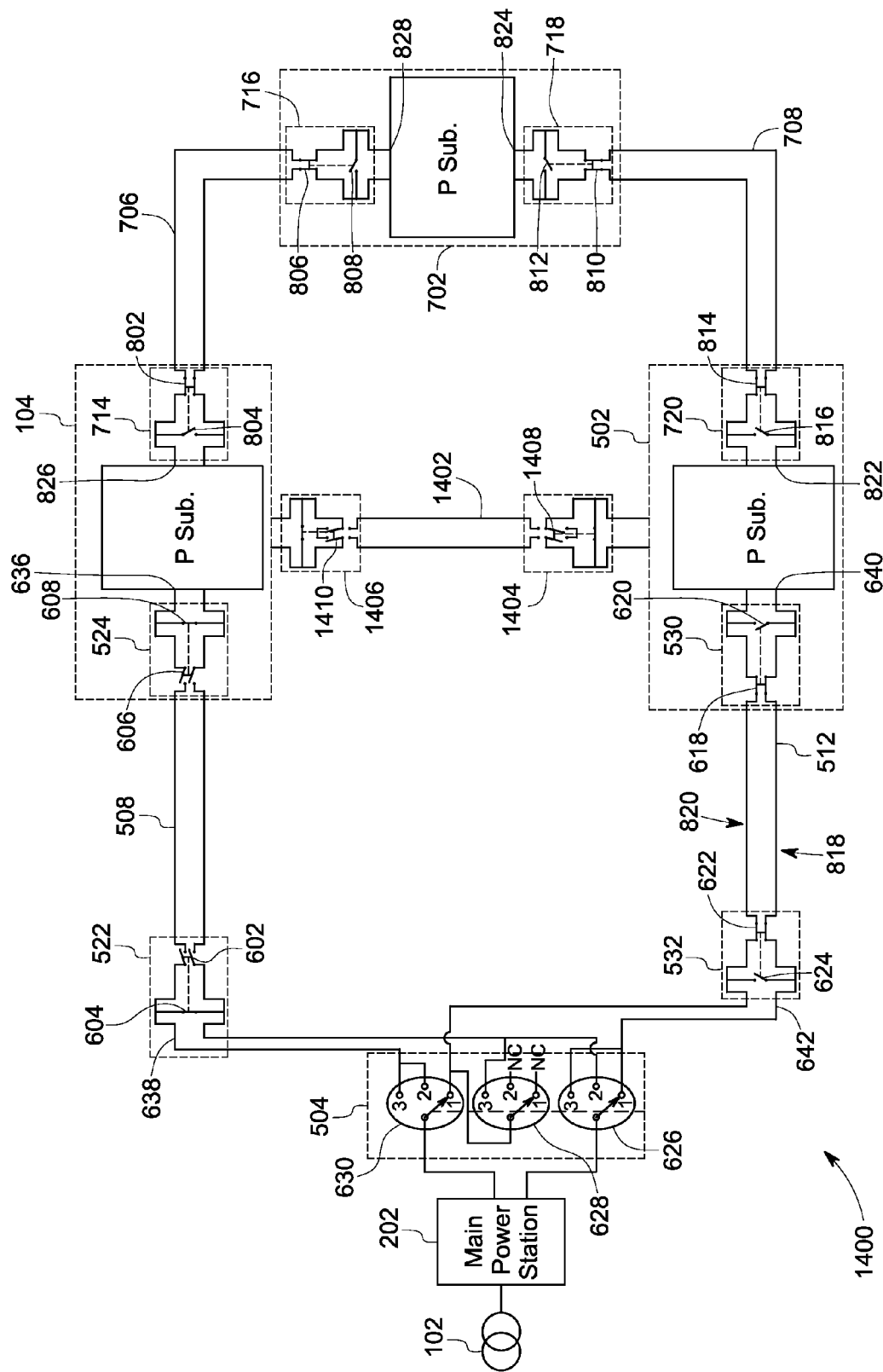
FIG. 14 illustrates a power transmission system depicting a mesh network topology, in accordance with one embodiment.

FIG. 14 illustrates a power transmission system 1400 depicting a mesh network topology in accordance with one embodiment. The configurations and functionalities of the elements in the system 700 are additionally applicable to the system 1400. In the embodiment of FIG. 14, an additional fifth segment 1402 is positioned between the first and second power substations 104 and 502. A pair of fifth segment switch units 1404 and 1406 may also be positioned at or near opposing ends of the associated segment 1402. The system 1400 illustrates the embodiment where either the first segment 508 is faulty or both the first and fifth segments 508 and 1302 are faulty. In such embodiments, the shorting and disconnect switch elements in the segment switch units associated with the faulty segment may be configured to be in the closed and open positions, respectively. The rest of the disconnect and shorting switch elements (in the system 1400) may be configured to be in the closed and open positions, respectively.

In some embodiments, the system 1400 may handle simultaneous fault events in any two segments of the DC cable 704. For example, the system 1400 may handle simultaneous fault events in the first and second segments 508 and 706. In such embodiments (not shown), the disconnect switch elements 1408 and 1410 may be configured to be in the closed positions to provide power to the first power substation 104 via the third segment 512 and further through the fifth segment 1402. The second power substation 502 may be provided power from the third segment 512, whereas the third power substation 702 may be provided power from the third and fourth segments 512 and 708. Similarly, in some embodiments, the system 1400 may handle the fault events in the first and fourth segments 508 and 708, or the third and fourth segments 512 and 708, or the second and third segments 706 and 512. In one embodiment, the system 1400 may further include a sixth segment (not shown in FIG. 14) that may electrically connect the main switch unit 504 directly to the third power substation 702.

In some embodiments, the system 1100, 1200, 1300, or 1400 may be replaced with any other power transmission system such as, but not limited to, any configuration of the power transmission system 100, 500, or 700 while achieving the same advantage of bi-directional power flow using a modular stacked power conversion system. Any desired number of power substations or main power stations may be included in the power transmission system (100, 500, 700, 1100, 1200, 1300, or 1400), and the power substations and main power stations may include any number of power converter modules and loads electrically connected to these modules without deviating from the scope of the invention.

Figure 15:
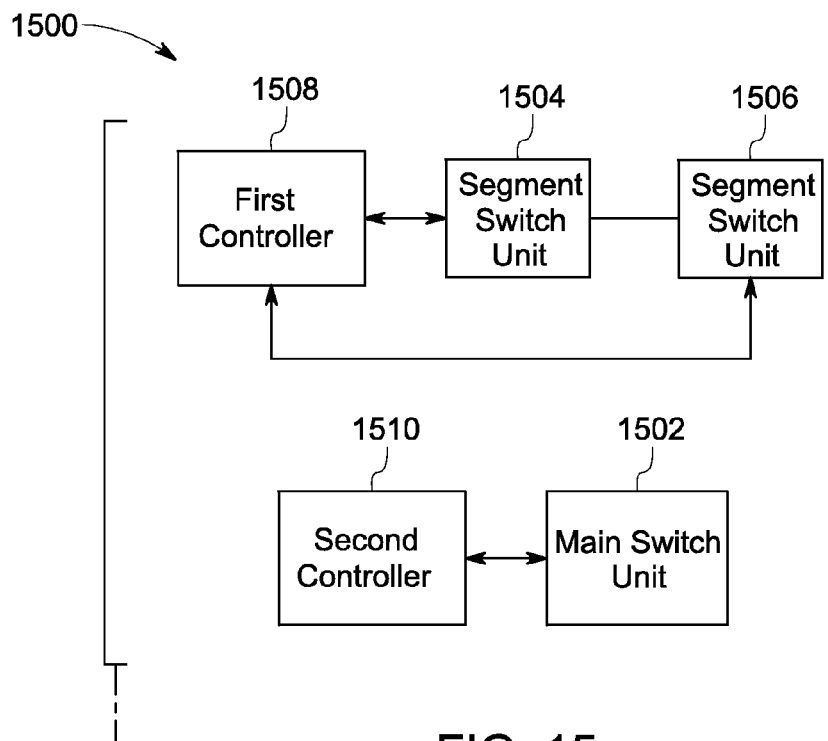
FIG. 15 is a block diagram of a controller system for controlling the operations of a main switch unit and a pair of segment switch units, in accordance with one embodiment.

In some embodiments, a controller may be provided to operate a main switch unit and segment switch units of the power transmission system (100, 500, 700, 1100, 1200, 1300, or 1400). FIG. 15 is a block diagram of a controller system 1500 for controlling the operations of a main switch unit 1502 and a pair of segment switch units 1504 and 1506 in the event of the fault on a respective cable segment, in accordance with one embodiment. In some embodiments, the controller system 1500 may include a computing device and/or processors (situated locally, remotely, or both locally and remotely) that may be configured to send commands to the main switch unit 1502 and the segment switch units 1504 and 1506. The term "command" as used herein refers to an electronic signal that includes a command for a main switch unit or a segment switch unit to perform a certain task. The command may be, for example, a disconnect command, a connect command, a shorting command, a shorting removal command, or a routing command as described below in some embodiments. In one embodiment as shown in FIG. 15, the controller system 1500 includes a first control unit 1508. The first control unit 1508 may be configured to send a disconnect command to disconnect switch elements (not shown in FIG. 15) in the segment switch units 1504 and 1506 simultaneously, in the event of the fault on the respective segment. The disconnect command may result in opening the disconnect switch elements, thus isolating the faulty segment from the rest of the power transmission system (100, 500, 700, 1100, 1200, 1300, or 1400). In another embodiment, the first control unit 1508 may be further configured to send a connect command to connect previously disconnected switches in other segment switch units that are associated with an operational segment. The connect command may result in closing the disconnect switch elements to electrically connect the operational segment to the power transmission system (100, 500, 700, 1100, 1200, 1300, or 1400). Similarly, the first control unit 1508 may be configured to send a shorting command or a shorting removal command to one or more shorting switch elements (not shown in FIG. 15) in order to establish or remove, respectively, the short circuit path.

As described above in some embodiments, the shorting path may be created prior to disconnection of the faulty segment. Therefore the first control unit 1508 may send the shorting command to the shorting switch element associated with the faulty segment, and subsequently send the disconnect command to the disconnect switch element associated with the faulty segment. However, when the repaired/replaced cable is to be connected back to the power transmission system, the first control unit 1508 may send the connect signal to the disconnect switch element associated with the repaired/replaced segment, followed by the shorting removal command to the shorting switch element associated with the repaired/replaced segment. In some other embodiments, the first control unit 1508 may send the shorting/shorting removal and disconnect/connect commands to activate the shorting switch element and its associated disconnect switch element simultaneously.

In some embodiments as shown in FIG. 15, the controller system 1500 further includes a second control unit 1510 that may be configured to send a routing command to the main switch unit 1502. The routing command may result in the main switch unit 1502 to route the power to one or more power substations via the one or more operational segments. Particularly, the routing command may facilitate in determining the position (either position "1", "2" or "3") of main switches in the main switch unit 1502. As described earlier in some embodiments, the position of the main switches may facilitate in determining the path that the power will take to reach the one or more power substations from the main switch unit 1502. In some embodiments, the first control unit 1508 may be configured to send a trigger command to the second control unit 1510, simultaneous with or subsequent to sending shorting/shorting removal and disconnect/connect commands to the segment switch units. The trigger command may trigger the second control unit 1510 to send the routing command to the main switch unit 1502. In one embodiment, the first and second control units 1508 and 1510 may be integrated into a single control unit performing the functionalities of both the first and second control units 1508 and 1510.

In some embodiments, the controller system 1500 may either be manually operated by an operator or triggered automatically upon determining the fault event. Alternatively, in some other embodiments, the power transmission system may omit the controller system 1500 from the power transmission system in embodiments where the main switch unit and the segment switch units receive commands that are sent directly by the operator.

In one embodiment, the fault event may be determined by any known techniques of detecting faults in a cable, such as, but not limited to, by detecting change in the voltage or current across a cable segment, for example, using sensors installed at opposite ends of a cable segment, or by detecting current in an earthing resistor. In embodiments where the event of the fault is a regular scheduled maintenance, the operator may use a maintenance schedule or some other planning guide or, in some circumstances, may manually determine the faulty event by obtaining data regarding the general wear and tear of the cable segment.

Figure 16:
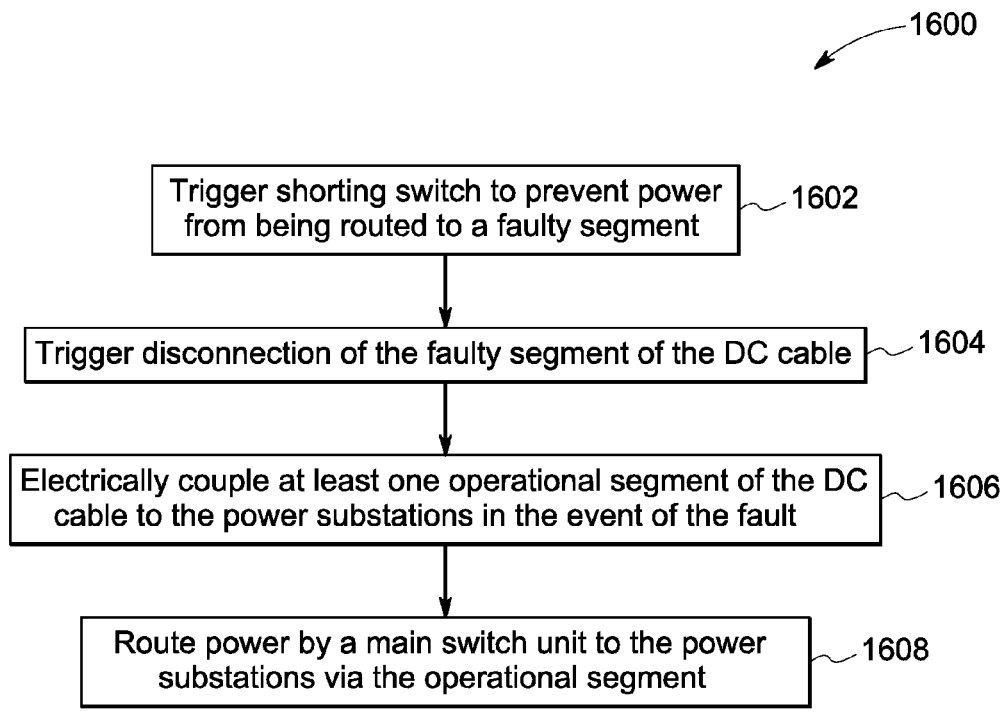
FIG. 16 is a flowchart depicting a method for providing a cable segment failover support in a power transmission system, in accordance with one embodiment.

FIG. 16 is a flowchart depicting a method 1600 for providing a cable segment failover support in a power transmission system, in accordance with one embodiment. The method 1600 ensures that the power transmission system remains operational even in the event of a fault on or a maintenance event for a respective segment of a DC cable. The power may be transmitted in a power transmission system such that the power from a power source may be transmitted to one or more power substations via one or more segments of the DC cable during a normal operation, that is, when there is no fault event in any of the DC cable segments. In some embodiments, the DC cable segment may be electrically coupled to the respective power substation. Also, in some embodiments, the segments may individually or in combination form a path to route the power to the power substations.

In some embodiments, the power transmission system may further include at least one segment switch unit electrically coupled to the respective segment. Some or all segment switch units may include a disconnect switch element and a shorting switch element, in accordance with some embodiments. At step 1602, in the event of the fault in one of the segments, the shorting switch element(s) associated with the faulty segment are triggered to provide a short circuit path for the power received at the segment switch unit(s) associated with the faulty segment. Creating the short circuit path facilitates in preventing the power that will be received at the segment switch unit(s) from being further routed to the faulty segment.

At step 1604, the disconnect switch element(s) associated with that faulty segment are triggered to disconnect the faulty segment. In some embodiments, the triggering at steps 1602 and 1604 may be achieved by a controller system such as the controller system 1500 or manually by an operator as described above. For example, in the event of the fault in the first segment, the disconnect switch elements associated with the first segment may be configured to be in open positions such that the first segment may be electrically isolated from the power transmission system.

In some embodiments, disconnect and shorting switch elements of the same segment switch unit may be configured to be triggered simultaneously or may be integrated into a single switch such as the three pole switch of FIG. 4. In other embodiments, to avoid or reduce an arc flash, it may be useful to trigger the shorting switch element to provide a short circuit path prior to causing the disconnect switch element to disconnect the respective segment. The configurations of these disconnect and shorting switch elements may be inversely proportional such that if one of these switches is closed, the other may be opened.

At step 1606, the operational segments are configured to be electrically coupled to the rest of the power transmission system, specifically to the power substation, in the event of the fault if such segments are not already coupled to the power substation. For example, in the event of the fault in the first segment, the disconnect switch elements associated with the second segment may be configured to be in closed positions to electrically connect the second/operational segment to the rest of the power transmission system. Also, in the event of the fault in the first segment, the shorting switch elements associated with the second segment may be configured to be in open positions, if not already open.

At step 1608, the power is routed by a main switch unit to the power substations via the operational segments. For example, in the event of the fault in the first segment, the main switch unit may route the power to a power substation via the second segment. In some embodiments, the main switch unit may include two pole two position main switches such as the main switches 220 and 222, or three pole three position switches such as the main switches 626, 628 and 630.

The failover support provided by the power transmission system (100, 500, 700, 1100, 1200, 1300, or 1400) may be useful to maintain power transmission during the period of repair/replacement of the faulty cable segment. Since repairing a subsea cable typically may require a long time, for example a couple of weeks, it may be advantageous to implement the power transmission system (100, 500, 700, 1100, 1200, 1300, or 1400) that can be kept fully operational even in the event of the fault in the cable segment.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A power transmission system comprising:
    at least one power substation for receiving power from a power source;
    a Direct Current (DC) cable for transferring the power from the power source to the power substation, the DC cable comprising one or more cable segments forming a first path to route the power to the power substation and further one or more cable segments forming a second path to route the power to the power sub station;
    a main switch coupled between the power source and the at least one power substation and configured for, in the event of a fault on or a maintenance event for a cable segment of one of the first and second paths, routing the power to the power substation via the one or more operational cable segments of the other of the first and second paths; and
    a plurality of segment switch units, each cable segment being electrically coupled to at least one segment switch unit, wherein each segment switch unit comprises:
        at least one shorting switch element for providing a short circuit path to prevent the power from the power source to be routed to the faulty cable segment in response to a shorting command, and
        at least one disconnect switch element for disconnecting the faulty cable segment in response to a disconnect command.

2. The system of claim 1, wherein each cable segment is electrically coupled to a pair of segment switch units at or near opposite ends of the cable segment.

3. The system of claim 1, wherein the power substation comprises a sub modular stacked power conversion system comprising a plurality of sub power converter modules electrically coupled in series to the DC cable.

4. The system of claim 3, wherein the power substation further comprises at least one load electrically coupled to at least one of the plurality of sub power converter modules.

5. The system of claim 1, further comprising a main power station electrically coupled between the power source and the main switch unit.

6. The system of claim 5, wherein the main power station comprises a main modular stacked power conversion system comprising a plurality of main power converter modules electrically coupled in series to the DC cable.

7. The system of claim 6, wherein the main power station further comprises at least one load electrically coupled to at least one of the plurality of main power converter modules.

8. The system of claim 1, wherein the at least one power substation comprises two or more power substations, wherein the two or more power substations are arranged in a ring, a star, a mesh, or a hybrid network topology.

9. The system of claim 1, wherein the at least one shorting switch element and the at least one disconnect switch element comprise separate switches.

10. A subsea DC power transmission system comprising:
   an onshore system comprising:
      a power source; and
   an offshore system comprising:
      power substations for receiving power from the power source, at least one or more of the power substations comprising a sub modular stacked power conversion system comprising a plurality of sub power converter modules,
      a main power station electrically coupled between the power source and the power substations, the main power station comprising a main modular stacked power conversion system comprising a plurality of main power converter modules,
      a main switch unit,
      a DC cable for transferring the power from the power source to the power substations, the DC cable comprising one or more cable segments forming a first path to route the power to the power substation and further one or more cable segments forming a second path to route the power to the power sub station,
      a main switch coupled between the power source and the at least one power substation and configured for, in the event of a fault on or a maintenance event for a cable segment of one of the first and second paths, routing the power to the power substation via the one or more operational cable segments of the other of the first and second paths; and
      a plurality of segment switch units, each cable segment being electrically coupled to at least one segment switch unit, wherein each segment switch unit comprises:
         at least one shorting switch element for providing a short circuit path to prevent the power from the power source to be routed to the faulty cable segment in response to a shorting command, and
         at least one disconnect switch element for disconnecting the faulty cable segment in response to a disconnect command.

11. The system of claim 10, wherein the sub modular stacked power conversion system facilitates power to flow through the plurality of segments bi-directionally.

12. A method for transmitting power in a power transmission system comprising power substations for receiving power from a power source, and a DC cable comprising one or more cable segments forming a first path to route the power to the power substations and further one or more cable segments forming a second path to route the power to the power substations, the method comprising
   in the event of a fault on or a maintenance event for a cable segment of one of the first and second paths, routing the power to the power substation via the one or more operational cable segments of the other of the first and second paths by:
      (i) triggering at least one shorting switch element of at least one segment switch unit electrically connected to the faulty cable segment to provide a short circuit path to prevent the power from the power source to be routed to the faulty cable segment;
      (ii) triggering at least one disconnect switch element of the at least one segment switch unit to disconnect the faulty cable segment; and
      (iii) routing the power to the power substations via the one or more operational segments of the other of the first and second path.

13. The method of claim 12, wherein triggering the at least one shorting switch element comprises sending a shorting command to the at least one shorting switch element.

14. The method of claim 12, wherein triggering the at least one disconnect switch element comprises sending a disconnect command to the at least one disconnect switch element.

15. The method of claim 12 further comprising sending a routing command to the main switch unit for triggering the main switch unit to route the power to the power substation via the one or more operational segments of the other of the first and second paths.

* * * * *